May 14, 1963 C. B. STADUM ETAL 3,089,948
ELECTRIC DISCHARGE APPARATUS
Filed Feb. 21, 1952 13 Sheets-Sheet 1
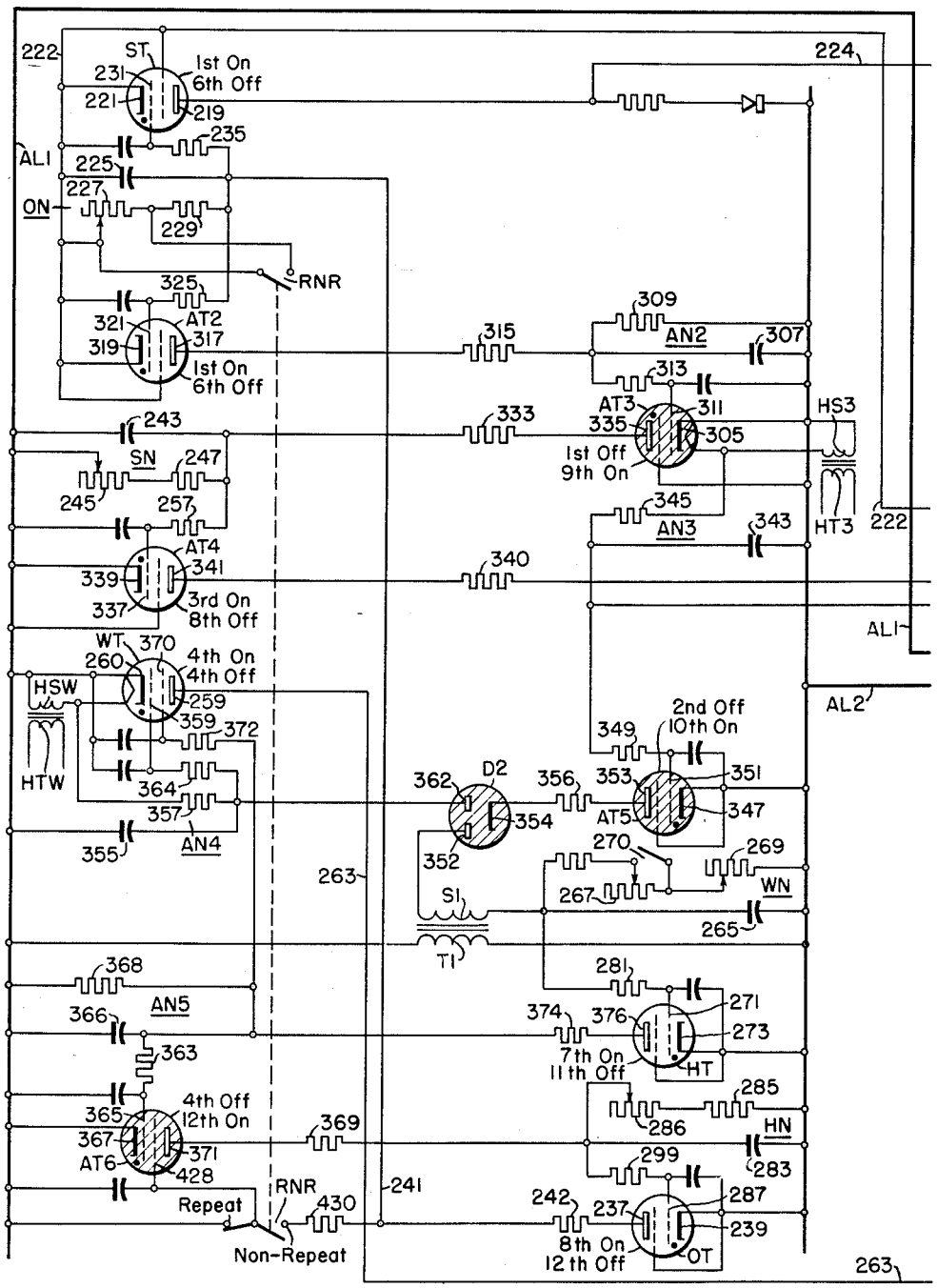
SEQUENCE TIMER
Fig. IA.
WITNESSES:
Robert A Baird
Leon J. Faza
INVENTORS
Clarence B. Stadum, Edward C. Hartwig
and Hubert W. Van Ness.
BY
Hymen Diamond
ATTORNEY May 14, 1963   C. B. STADUM ETAL   3,089,948
ELECTRIC DISCHARGE APPARATUS
Filed Feb. 21, 1952   13 Sheets-Sheet 3

WITNESSES:
INVENTORS
Clarence B. Stadum, Edward C. Hartwig
and Hubert W. Van Ness.
BY
ATTORNEY

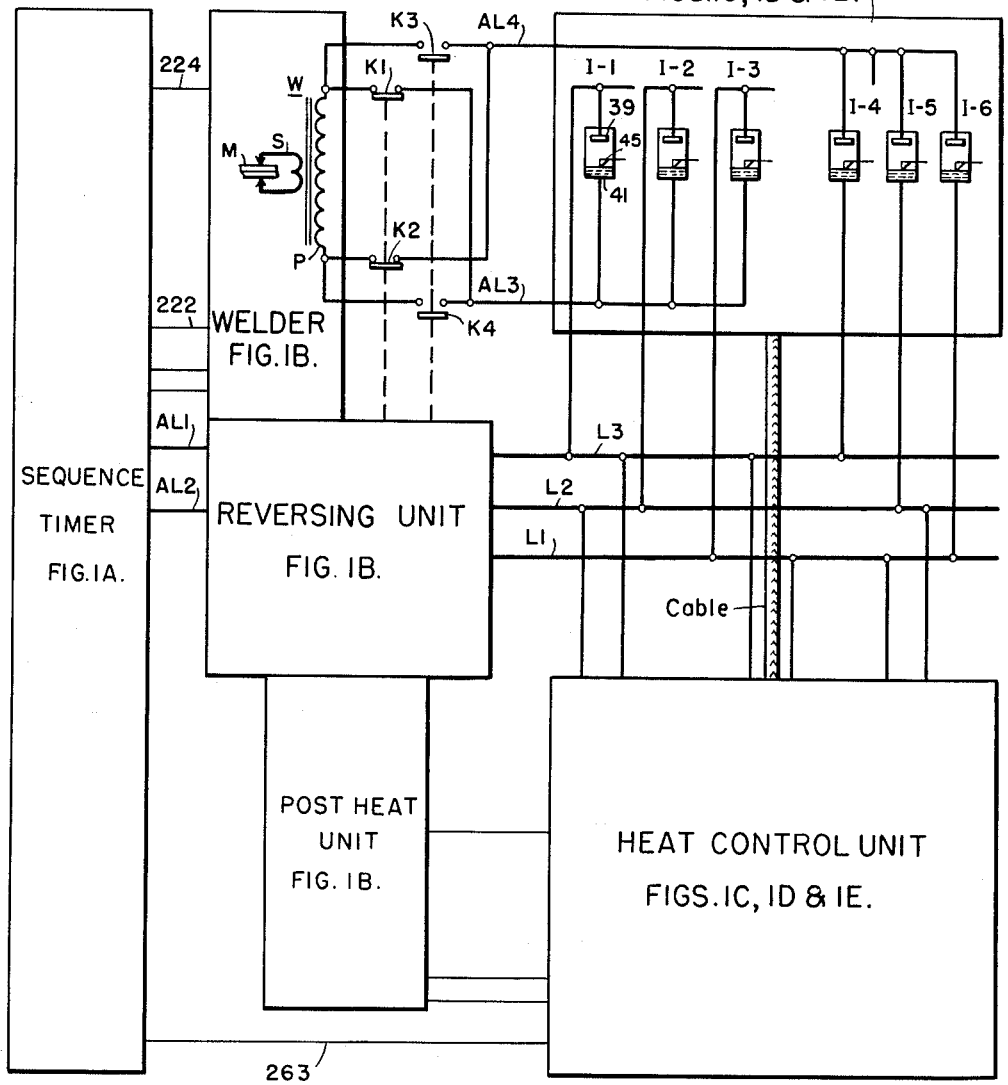

May 14, 1963

C. B. STADUM ETAL 3,089,948

ELECTRIC DISCHARGE APPARATUS

Filed Feb. 21, 1952

WITNESSES:
★ RR2 - Make before break.
✶ RR1 - Break before make.

INVENTORS
Clarence B. Stadum, Edward C. Hartwig
and Hubert W. Van Ness.
BY
ATTORNEY May 14, 1963 C. B. STADUM ETAL 3,089,948
ELECTRIC DISCHARGE APPARATUS
Filed Feb. 21, 1952 13 Sheets-Sheet 11

WITNESSES:
E. A. M'Closkey.
Leon J. Taza

INVENTORS
Clarence B. Stadum, Edward C. Hartwig
and Hubert W. Van Ness.
BY
Hymen Diamond
ATTORNEY May 14, 1963 C. B. STADUM ETAL 3,089,948
ELECTRIC DISCHARGE APPARATUS
Filed Feb. 21, 1952 13 Sheets-Sheet 13
Fig.8.
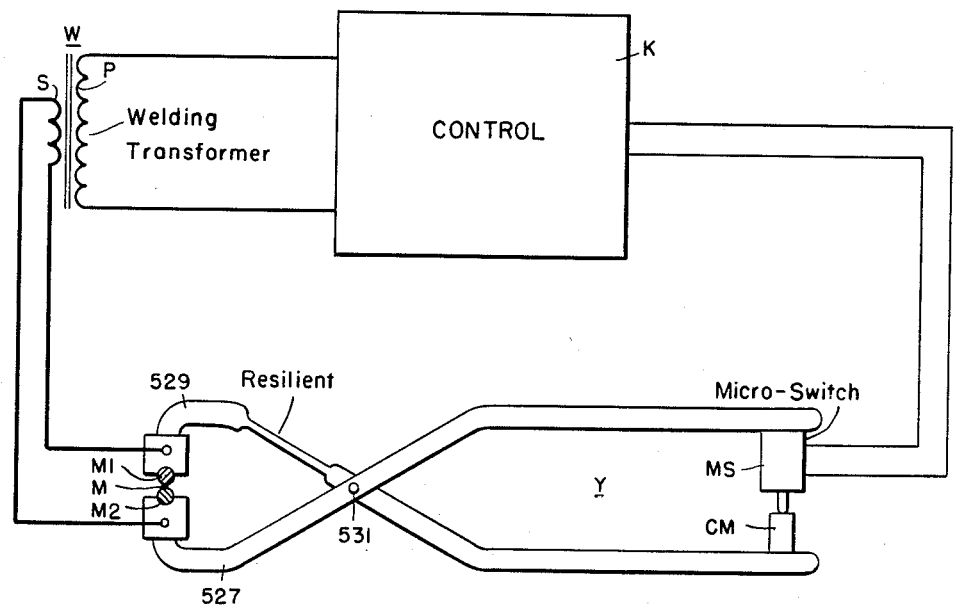
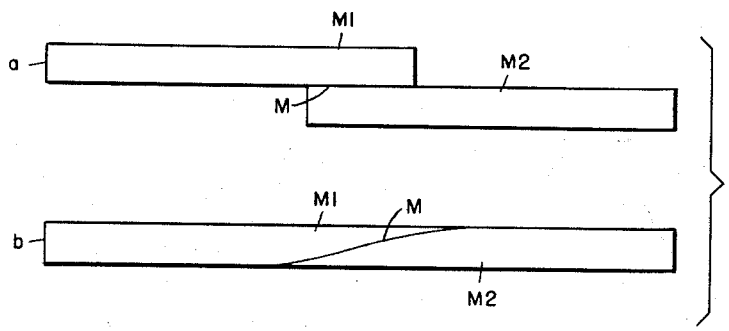
Fig.9.
WITNESSES:
INVENTORS
Clarence B. Stadum, Edward C. Hartwig
and Hubert W. Van Ness.
BY
ATTORNEY 3,089,948
ELECTRIC DISCHARGE APPARATUS
Clarence B. Stadum, Snyder, Hubert W. Van Ness,
Buffalo, and Edward C. Hartwig, Lancaster, N.Y., assignors to Westinghouse Electric Corporation, East Pittsburgh, Pa., a corporation of Pennsylvania
Filed Feb. 21, 1952, Ser. No. 272,818
20 Claims. (Cl. 219—114)

Our invention relates to electric discharge apparatus and has particular relation to apparatus for controlling the supply of current from a polyphase source of alternating current to a load such as an electric welder.

Patent 2,508,467 to J. R. Parsons and Edward C. Hartwig, and Patent 2,619,591 to J. R. Parsons, are illustrative of the prior art relating to our invention. In the welding system disclosed in the Parsons et al. patent, the welding transformer has three primaries and a single secondary. Power is supplied directly to these primaries from the buses of a polyphase source through three pairs of ignitrons connected in anti-parallel between the buses and the primaries. With each of these six ignitrons, a firing tube is associated. Each firing tube is controlled from a heat-control tube connected in a heat-control circuit. The conductivity of the six heat-control tubes is controlled from a sequence timer. The Parsons application discloses a similar system. Such systems have the advantage that the ignitrons may be connected directly to the buses of a three-bus commercial power supply. Thus, the neutral-tapped supply transformer customarily used with such apparatus is avoided.

On the whole, the type of welding system disclosed in the Parsons et al. patent and in the Parsons application has proved satisfactory for many purposes. But, we have found in our work with such a system that it has certain disadvantages. The transformer is uneconomical in its copper requirements. Because the transformer includes three primaries, each operating for one-third of the time of operation of the transformer, it requires an excessively large quantity of copper. The control circuit is highly complex and because of this complexity is costly and imposes high installation and maintenance costs. In addition, the many interrelated electronic components which this circuit includes confront servicing personnel with difficulties in locating a source of defective operation. In addition, in spite of its high cost, such a system is incapable of delivering sufficient power for the welding of heavier gauges of such materials as aluminum, brass, bronze, and the like.

It is, accordingly, an object of our invention to provide apparatus of relatively simple and low-cost structure having low installation and maintenance cost for controlling the supply of power from a polyphase source to a welder.

Another object of our invention is to provide relatively simple and low-cost electric discharge apparatus which is adapted to be interposed directly between the buses of a commercial polyphase source which does not have a neutral and a welding transformer for controlling the supply of power to the welding transformer.

Still another object of our invention is to use a single-phase load transformer, such as a welding transformer, for example, having minimum copper requirements, with discharge apparatus for controlling the supply of power from a polyphase source to the transformer, which discharge apparatus shall be adapted to be connected directly and not through a supply transformer having a neutral tap, to the buses of the source.

A further object of our invention is to provide an improved welding system particularly suitable for the welding of heavy gauge metals and alloys such as aluminum, brass, bronze and the like.

A still further object of our invention is to provide an improved welding system particularly suitable for welding together the ends of rods composed of such metals as aluminum.

An incidental object of our invention is to provide an improved converter for converting the power from a commercial polyphase source to single phase at a frequency lower than that of the source.

Another incidental object of our invention is to provide an improved heat-control circuit for a low-frequency welder adapted to be energized from a polyphase source.

A further incidental object of our invention is to provide an improved relay circuit particularly suitable for controlling an electric welder.

An ancillary object of our invention is to provide a novel sequence timer particularly adapted to operate with control apparatus in accordance with our invention.

Another ancillary object of our invention is to provide a novel heat-control network particularly suitable for producing welding current of such wave form that it has a post-heating function as well as a welding function.

In accordance with our invention, we provide a system including a welding transformer having only a single primary which is supplied through a current-reversing mechanism from a converter directly connected to the buses of a polyphase source. The reversing mechanism performs the function of periodically reversing the current flowing through the primary, and the converter need be capable of delivering current of only one polarity to the mechanism and may be of simple, low-cost structure.

The converter comprises a plurality of pairs of main discharge devices, the devices of each pair being connected directly to a supply bus and, through the reversing mechanism, to the terminals of the primary. The discharge devices are so connected that at any instant current may flow in one direction between two buses through associated discharge devices and the primary, current flowing away from the positive bus through one of the latter devices and returning to the negative bus through the other. With the reversing mechanism set in one position, the discharge devices are rendered conductive in succession, starting with two selected devices, to conduct current of one polarity during a predetermined interval which may be substantially longer than a period of the commercial supply. At the end of the interval, the discharge devices remain non-conductive for a predetermined quiescent time interval. The reversing mechanism is operated during this quiescent zero-current interval, and during the succeeding conductive interval, current of opposite polarity flows through the primary.

Where welds are to be produced in rapid succession, as in a seam welder, the discharge devices are rendered conductive in succession, and the reversing mechanism is operated repeatedly at a predetermined periodicity. The current flowing through the primary is then, in effect, low-frequency alternating current having a period equal to the time which elapses between the beginnings of successive conductive intervals of the same polarity. Sometimes, independent spot welds are produced at substantial intervals. Under such circumstances, succeeding spot welds are produced with current of the opposite polarity if the reversing mechanism is operated during the quiescent intervals. In either case, magnetic saturation of the welding transformer is avoided by the current reversals.

While our invention involves a number of features, there are several which are of particular importance. Several of these we shall now describe.

One important feature involves the operation of the reversing contactor. If the reversing contactor is actuated while welding current flows, its life will be materially reduced. It is important, then, that provisions be made for assuring that the contactor is not actuated while welding current is flowing. We, therefore, provide a system including a sequence timer which cooperates with the reversing contactor to actuate it during the intervals the electrodes are pressed against the material being welded, known as the squeeze intervals.

A portion of each squeeze interval is consumed in actuating the contactor and the squeeze interval must be sufficiently long for this purpose. In accordance with another feature of our invention, this disadvantage is avoided by conditioning the contactor to operate during the weld interval and operating it during the hold interval.

Another important feature of our invention is the provision of a direct-current reversing contactor. Since the contactor is operated repeatedly, it must be so designed and constructed as to withstand the repeated shocks. While a sturdy A.C. contactor serves reasonably satisfactorily, we have found that a D.C. contactor is more satisfactory. A D.C. contactor is operated by current maintained continuously at the same level, while an A.C. contactor is operated by current which varies repeatedly between zero and a maximum value. To achieve the same operation, the amplitude of the current supplied to an A.C. contactor must be substantially higher than the magnitude of the current for a D.C. contactor. The coils of a D.C. contactor are then smaller than those of an A.C. contactor, and the contacts of the former are not actuated so sharply as the contacts of the latter. A D.C. contactor is thus better able to withstand the wear of repeated actuation than an A.C. contactor.

Preferably, the D.C. contactor is of type MM sold by Westinghouse Electric Corporation (see page 2.3226, Temporary Industrial Control Engineering Handbook) which is capable of 15,000,000 repeated operations without failure. This contactor has two sets of contacts and a pair of operating coils for operating these contacts. The contacts are positively interlocked and are so arranged that one or the other set is normally closed while the remaining set is open. Positive control of the reversing of the current flow through the primary of the welding transformer is thus achieved.

Still another important feature of our invention involves the connection of main discharge devices to the welding transformer. These devices are so connected that at any time two devices conduct current through the primary of the transformer in series, one conducting from one supply bus to the primary and the other from the primary to another supply bus. When the welding current is initiated, it is then essential that two such discharge devices be rendered conductive simultaneously. In accordance with a further feature of our invention, we provide a heat-control circuit for accomplishing this purpose.

In certain situations, particularly where the materials to be welded are of substantially different thicknesses, it is desirable that current conducted during succeeding intervals be of a selected polarity only. In accordance with still another feature of our invention, we provide control means which provides not only that current of alternating polarity is conducted through the primary but also that the discharge devices conduct current through the primary of the welding transformer either in one direction or the other, depending on the desires of the operator. Thus, an operator welding materials of substantially different thickness may set the control so that for a time, current of one polarity is transmitted through the primary. With this setting, the welding is effected with the thicker material, while the thinner material is in one position relative to the welding electrodes. Thereafter, the setting may be changed so that the current flow through the primary of the welding transformer is reversed, and the position of the materials relative to the welding electrodes may be reversed. With this control, saturation may also be avoided.

The cooperation of the discharge apparatus and the reversing mechanism according to our invention provides a high degree of flexibility in the operation of the apparatus. At the same time, the discharge devices required and their associated components are maintained at a minimum, and the system is relatively simple, reqiuring a minimum of installation and maintenance.

In accordance with a further important feature of our invention, the main discharge devices are rendered conductive in succession at intervals equal to $360°/2n$, where $n$ is the number of phases of the supply. Where a system embodying our invention is supplied from the usual three-phase supply, the discharge devices are thus rendered conductive at intervals of ⅙ of a period. Initially, two discharge devices, one connected to each terminal of the primary, are rendered conductive; then discharge devices connected to one terminal and the other of the primary are rendered conductive alternately in succession, and after each new discharge device begins to conduct, one of the devices which has been conducting becomes non-conducting. During such operation, there is a short time interval, called the commutation period, during which these devices are conductive.

We have found that with the discharge devices thus rendered conductive at intervals of ⅙ of a period, sound welds can be produced with relatively heavy gauge metals such as aluminum, bronze, and brass. The success in the welding of such metals appears to arise from the fact that the current which our invention is capable of supplying to the primary is substantially higher than the current available in a system of the same rating of the prior art type.

During each commutation period defined above, when three devices are conductive, a large current, which we may call a commutation fluctuation, flows through the welding transformer, and a sharp decrease occurs in the voltage of the power conductors of the system. In available sequence timers, the weld time is timed out by a thyratron which has impressed in its control circuit a ripple voltage derived from the supply for determining the duration of the weld time. We have realized that such sequence timers are not suitable for our system because the commutation fluctuations entirely destroy the ripple wave form. In accordance with still another aspect of our invention, we have provided a sequence timer with a ripple-free control circuit for the thyratron which times out the weld time.

While the control of the discharge devices as outlined above is to be preferred, the discharge devices may, in accordance with the broad aspects of our invention, be rendered conductive differently. For example, the discharge devices connected to the opposite terminals of the primary may be rendered conductive simultaneously in pairs at intervals of $360°/n$ of a period where $n$ is the number of phases. Thus, where the supply is of the three-phase type, the discharge devices may be rendered conductive at intervals of ⅓ of a period of the supply. In apparatus of this latter type, the current available for welding would not be as high as in apparatus of the type discussed above.

The features of our invention that we consider novel are set forth in the appended claims. The invention, however, both as to its organization and its method of operation, together with additional objects and advantages thereof, will best be understood from the following description of specific embodiments when read in connection with the accompanying drawings, in which:

FIGURES 1A, 1B, 1C, 1D and 1E together are a circuit diagram of an embodiment of our invention;

FIG. 8 is a diagrammatic view illustrating a welding system embodying our invention for the welding of the ends of rods; and FIG. 9 is a diagrammatic view illustrating steps in a welding operation performed with the system shown in FIG. 8.

*Description for FIGS. 1A to 1E*

Figure 1B:
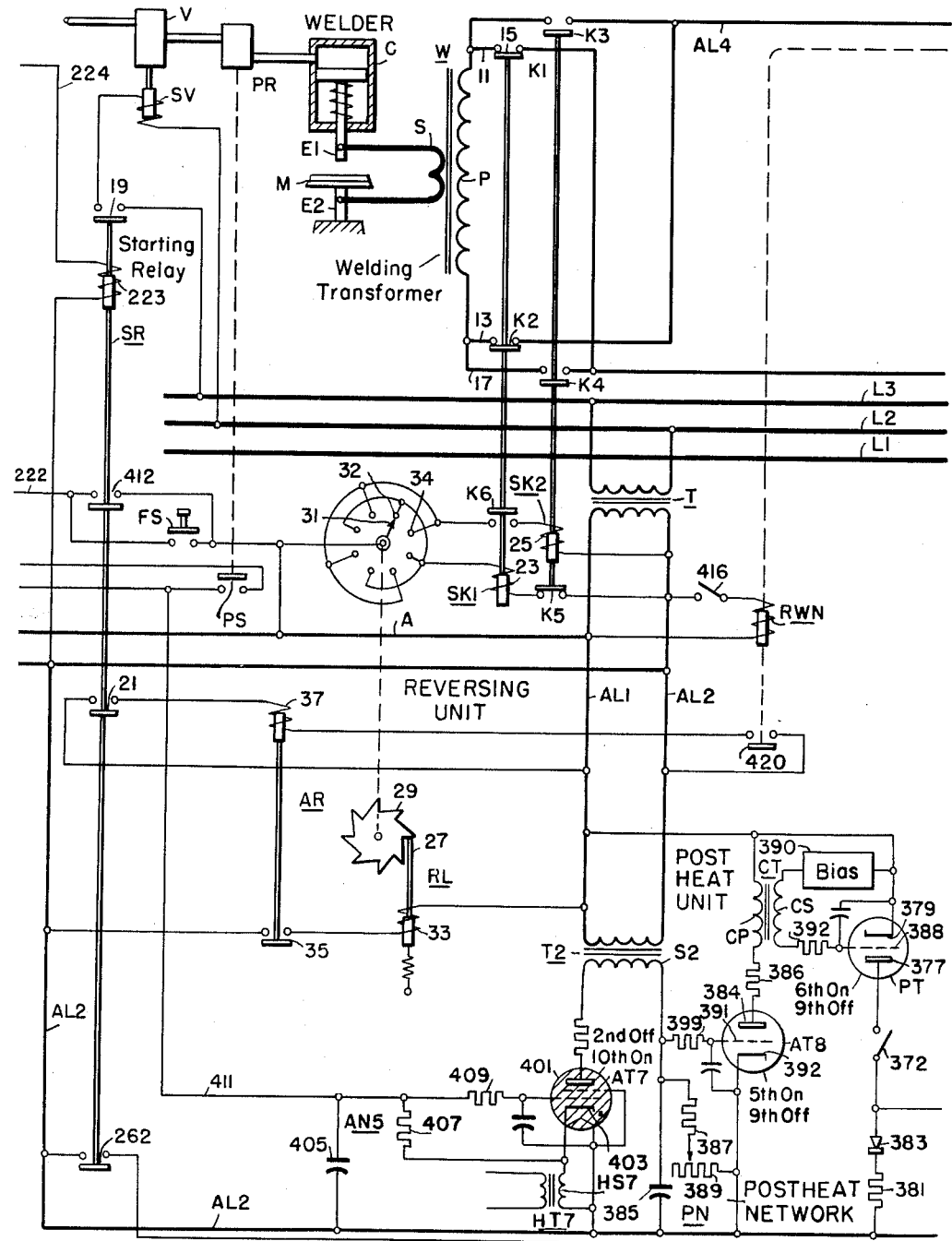
FIG. 1F is a block diagram which will facilitate understanding of FIGS. 1A to 1E.

The welding system shown in FIGS. 1A to 1E consists of a Welder, a Reversing Unit, a Power Supply Unit, a Heat-Control Unit, a Post-Heat Unit, and a Sequence Timer. The relationship between these units is shown in FIG. 1F. Power for the system is derived from the buses L1, L2, L3 of a commercial three-phase source in which are connected three reactances RX1, RX2 and RX3 which absorb the effect of a short circuit or commutation fluctuations in the apparatus. These reactances may be lumped or they may be the available regulation of the supply. The power for welding is derived directly from these main buses; the power for operating the various control components is derived from auxiliary buses AL1 and AL2 which are supplied from buses L3 and L2 through a transformer T.

The Welder includes welding transformer W, having a single primary P and a secondary S, a pair of welding electrodes E1 and E2 connected to S, one of which, E1, is movable by a hydraulic cylinder C in and out of engagement with material M to be welded, a magnetically actuable valve V which controls the admission of fluid under pressure into the cylinder, and a pressure switch PS operated by a pressure relay PR which closes when adequate pressure is applied by the electrodes to the material M.

Each of the windings P and S of the transformer W may, of course, be made up of a number of sub-windings connected either in series or in parallel. The primary P is provided with four terminal conductors 11, 13, 15 and 17. The solenoid SV of the valve V is controlled from a starting relay SR having a pair of normally-open contacts 19 and 21.

The Reversing Unit includes two pairs of reversing contacts K1 and K2, K3 and K4 of reversing contactors SK1 and SK2, respectively, each pair actuable by an exciting coil 23 and 25, respectively. The pair K1 and K2 is connected or adapted to be connected to two opposite terminal conductors 11 and 13, and the other pair K3 and K4 to the opposite terminal conductors 15 and 17. The unit also includes a stepping or ratchet relay RL. This relay comprises a stepping rod 27, actuable only when the relay is energized, which actuates a ratchet wheel 29 that moves the movable contact 31 of the relay RL from one position to a succeeding position as it is actuated. In alternate positions of the movable contact 31 of the ratchet relay RL, it engages fixed contacts 32 and current is supplied to the exciting coil 23 of one of the reversing contactors SK1 from auxiliary buses AL1 and AL2 through a normally-closed contact K5 of the other reversing contactor SK2. In the other positions of the movable contact 31 of the ratchet relay RL, it engages fixed contacts 34 and current is similarly supplied to the exciting coil 25 of the other reversing contactor SK2 through a normally closed contact K6 of the first reversing contactor SK1. The exciting coil 33 of the ratchet relay RL is supplied from the auxiliary buses AL1 and AL2 through a normally open contact 35 of an auxiliary relay AR. The exciting coil 37 of the latter is supplied from the auxiliary buses AL1 and AL2 through the normally-open contact 21 of the starting relay SR.

The Power-Supply Unit includes two sets each of three ignitrons I–1, I–2, I–3, and I–4, I–5, I–6. The anodes 39 of the ignitrons I–1, I–2 and I–3 are connected each to a bus L3, L2 and L1, respectively, of the supply, and the corresponding cathodes 41 are connected together to an auxiliary bus AL3 which is connected to one or the other terminal 11 or 17 of the primary P through the reversing contact K1 or K4 which happens to be closed. The cathodes 41 of the ignitrons I–4, I–5 and I–6 of the other set are each connected to a bus L3, L2 and L1, respectively, and their anodes 39 are connected together to an auxiliary bus AL4 which is connected to one or the other terminals 13 or 15 of the primary P through the reversing contacts K2 or K3 which happens to be closed. With one ignitron of each set conductive and one pair of reversing contacts closed, current flows through the primary P in one direction. When one ignitron of each set is conductive, and the other pair of reversing contacts closed, current flows through the primary P in the opposite direction.

The Power-Supply Unit also includes a firing thyratron FT1, FT2, FT3, FT4, FT5 and FT6, respectively, for each of the ignitrons I–1 to I–6. The cathodes 43 of the firing thyratrons FT1, FT2 and FT3 associated with the ignitrons I–1, I–2, I–3, having their cathodes 41 connected to the conductor AL3, are connected to the corresponding igniters 45 of the ignitrons, through current-limiting resistors 47, 49 and 51 and the contacts 53, 55 and 57 of a weld-no-weld relay RWN. The anodes 59 of these thyratrons are connected directly to the anodes 39 of the corresponding ignitrons I–1, I–2, I–3, respectively. The cathodes 43 of the remaining firing thyratrons FT4, FT5 and FT6 are directly connected each to its corresponding igniter 45 through a current-limiting resistor 61, 63 and 65, and the anodes 59 of these thyratrons are connected together through a common contact 67 of the weld-no-weld relay RWN to the auxiliary bus AL4, in effect, then, to the anodes 39 of the ignitrons I–4, I–5, I–6. It is to be noted that the anodes 59 of the thyratrons FT4, FT5 and FT6 may be connected through a common contact 67 because the anodes of the corresponding ignitrons I–4, I–5, I–6 from which the current for the corresponding igniters 45 is derived are at a common potential; a similar connection is not suitable for the thyratrons FT1, FT2, FT3 because the anodes of the latter are at different potentials. Separate contacts 53, 55, and 57 are required for the thyratrons FT1, FT2, and FT3 because the cathodes 43 of these thyratrons must be connected separately to the separate igniters 45.

Between the control electrode 69 and the cathode 43 of each thyratron FT1 to FT6, a surge-suppressing capacitor 71, 73, 75, 77, 79 and 81 respectively is connected. Each control electrode 69 is also connected to its corresponding cathode 43 through a grid resistor 83, 85, 87, 89, 91, and 93, a pair of additional resistors 95, 97, 99, 101, 103 and 105, and 107, 109, 111, 115 and 117 across each of which a firing signal is impressed, and a bias voltage source 119, 121, 123, 125, 127 and 129, respectively.

Figure 1C:
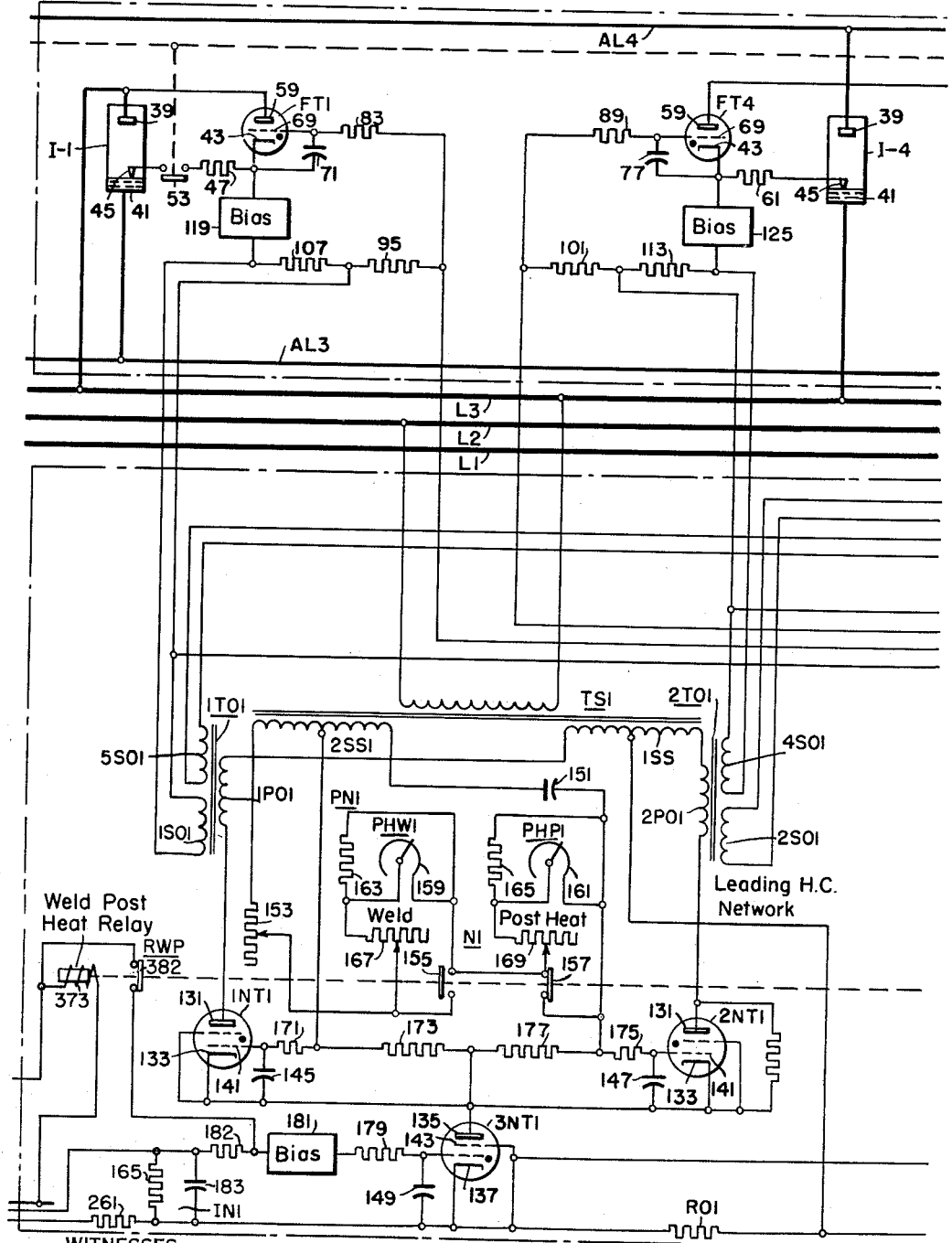
Figure 1D:
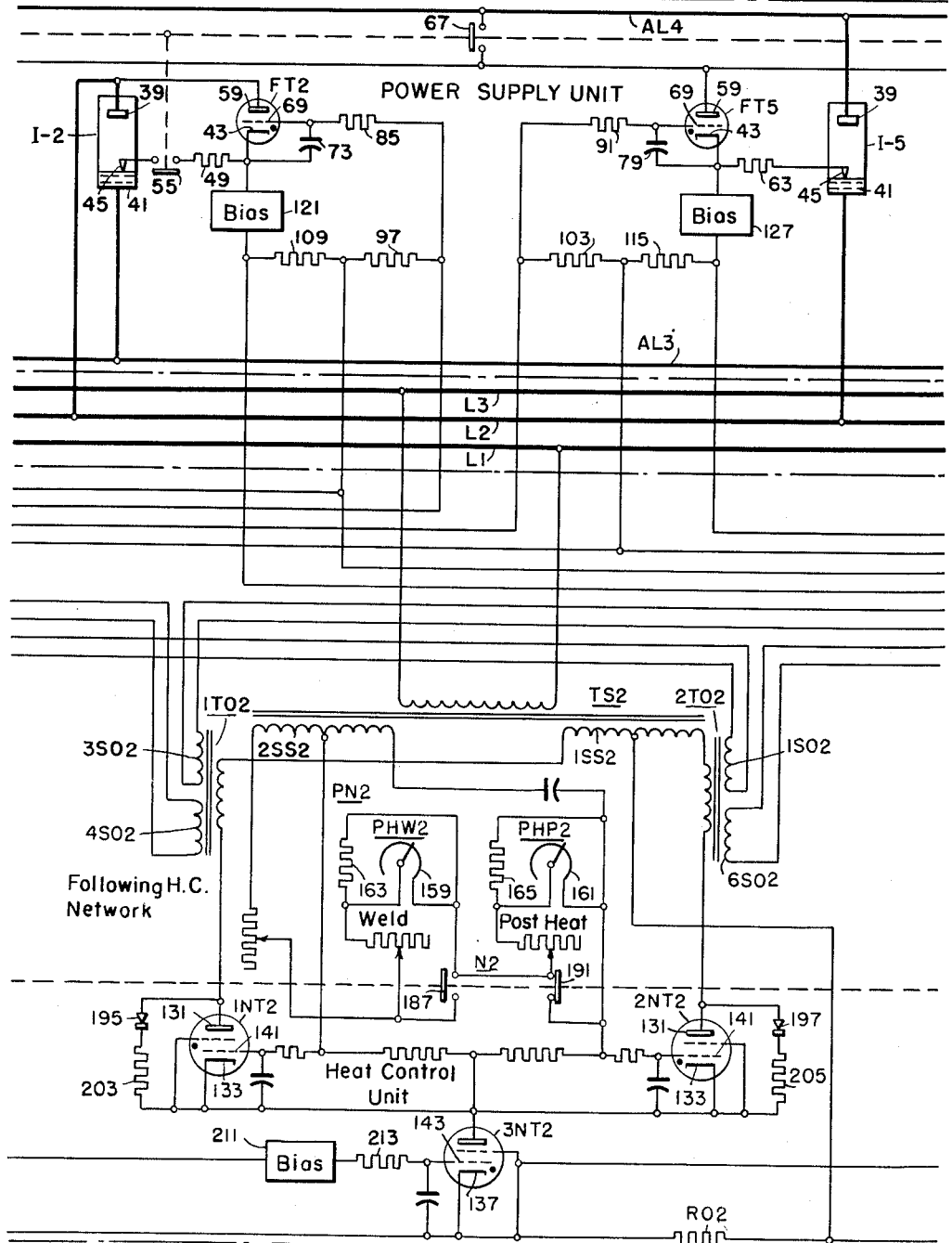
Figure 1E:
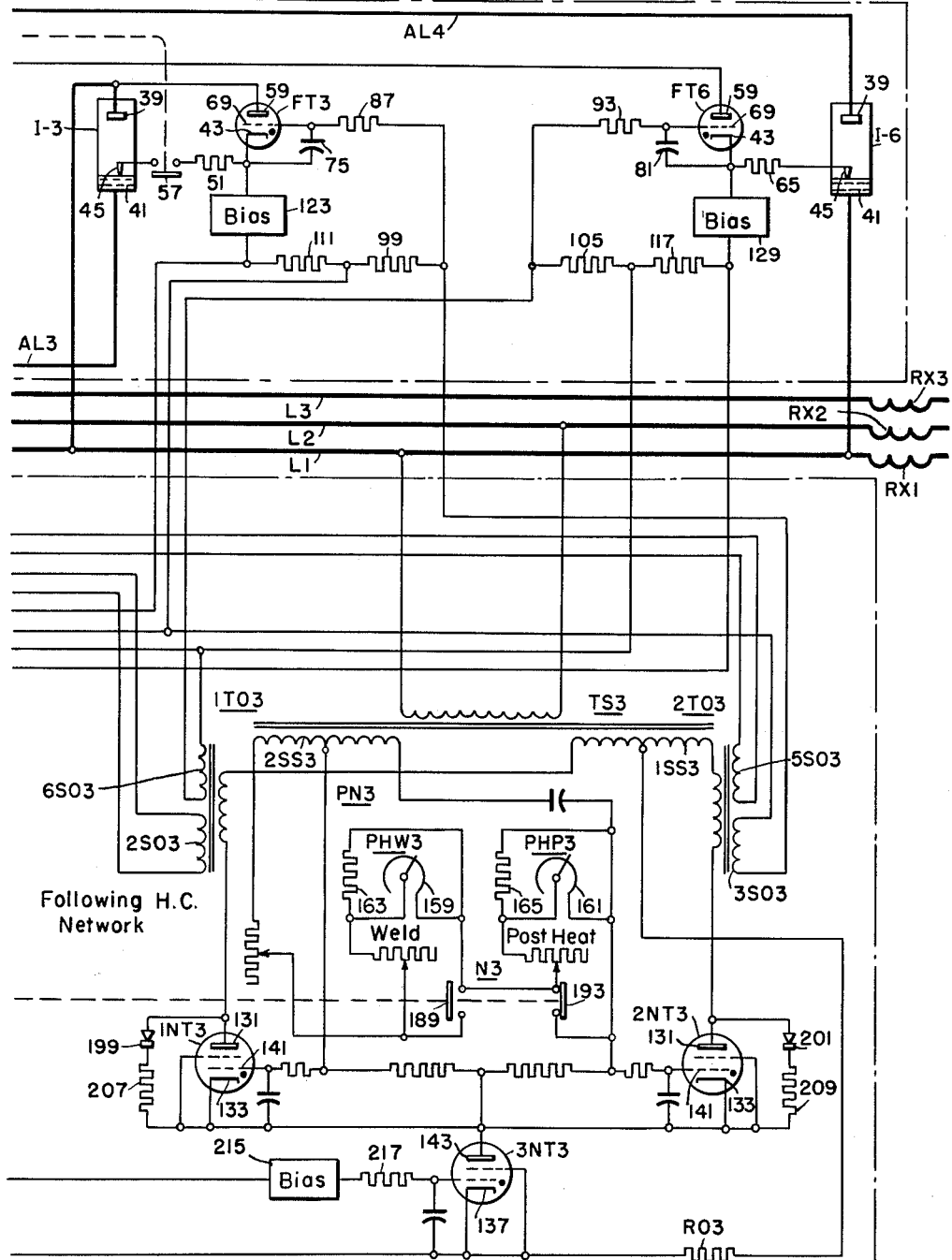

The Heat-Control Unit includes a leading heat control network N1 (FIG. 1C) and two following networks N2 (FIG. 1D) and N3 (FIG. 1E). The leading network N1 is associated with two of the buses L2 and L3 of the supply and controls the firing of the four ignitrons I–1, I–2, I–4 and I–5 connected to these buses. The following network N2 is associated with the buses L1 and L3 and controls the firing of the ignitrons I–1, I–3, I–4 and I–6, and the network N3 is associated with the buses L1 and L2 and similarly controls the firing of the ignitrons I–2, I–3, I–5 and I–6.

The heat-control network N1 is supplied with power from the buses L2 and L3 through a transformer TS1. The following heat-control networks N2 and N3 are also each correspondingly supplied from the buses with which it is associated, through a transformer TS2 and TS3.

Each of the transformers TS1, TS2, TS3 has a pair of secondaries 1SS1, 2SS1; 1SS2, 2SS2; and 1SS3, 2SS3, each provided with terminal taps and an intermediate tap.

The leading network includes three thyratrons 1NT1, 2NT1, 3NT1. The anodes 131 of two of the thyratrons 1NT1 and 2NT1 are connected each to a terminal tap of the secondary 1SS1 through the primary 1PO1 and 2PO1 of an output transformer 1TO1 and 2TO1. The cathodes 133 are connected together to the anode 135 of the other thyratron 3NT1; the cathode 137 of the latter is connected through an output resistor RO1 to the intermediate tap of the secondary 1SS1. Between the control electrode 141 and 143 and the cathode 133 and 137, respectively, of each thyratron 1NT1 and 2NT1 and 3NT1, respectively, a surge-suppressing capacitor 145, 147, 149 is connected.

The other supply secondary 2SS1 provides potential for a phase-shift network PN1 which determines the instants in the half periods of the phase of the supply from which the leading heat-control network N1 draws its power when the thyratrons 1NT1, 1NT2 and 1NT3 are rendered conductive. The phase-shift network consists of a capacitor 151 and a variable resistor 153, connected to opposite terminal taps of the secondary 2SS1. The capacitor 151 and resistor 153 are interconnected through the manually adjustable networks PHW1 and PHP1 which are connected in series. One or the other of these networks is at any time during operation shunted out by a contact 157 or 155 of the weld-post-heat relay RWP depending on the position of this relay. The networks PHW1 and PHP1 each include a rheostat 159 and 161 shunted by a resistor 163 and 165, respectively, and a variable resistor 167 and 169, respectively, in series with the shunted rheostat.

The series connection of the network PHW1 and PHP1 is an important feature of our invention. In analogous apparatus provided in accordance with the teachings of the prior art, such networks are connected in parallel, and one or the other is connected in the phase-shift network by contacts analogous to the contacts 157 and 155. In such systems, the phase-shift network is entirely open-circuited during the hiatus when the relay which corresponds to relay RWP is passing from one position to the other and a large transient is produced in the control circuits of the heat control thyratrons which fire or fail to fire improperly and, in turn, cause the corresponding firing thyratrons to operate improperly. In our system as just described, the resistances of the two networks PHW1 and PHP1 are connected in series during the hiatus when the relay RWP is operating and the transient is suppressed.

The intermediate tap of the secondary 2SS1 is connected to the control electrode 141 of the thyratron 1NT1 through a grid resistor 171, and to the cathode 133 of the thyratron 2NT1 through a resistor 173. The junction of the capacitor 151 and the networks PHW1 and PHP1 is connected to the control electrode 141 of thyratron 2NT1, through a grid resistor 175, and to its cathode 133 through a resistor 177. The potentials impressed between the control electrode and the cathode of thyratron 1NT1 is thus in opposite phase to the potential impressed between the control electrode and cathode of thyratron 2NT1. This phase relationship corresponds to the phase relationship of the potentials impressed between the anodes and the cathodes of the respective thyratrons from the secondary 1SS1.

The rheostats 159 and 161 may be manually set to determine at what angle in the half periods of the supply the thyratrons 1NT1 and 2NT1 are fired. The angle of firing corresponds to the setting of rheostat 159 if relay RWP is deenergized and to the setting of rheostat 161 if relay RWP is energized. In practice, rheostat 159 is set to correspond to the welding current required and rheostat 161 to the post-heat (or annealing) current required.

Between the control electrode 143 and the cathode 137 of the third thyratron 3NT1, a grid resistor 179, a bias voltage source 181, an additional resistor 182 which we may call a lock-out resistor, and an input network IN1 consisting of a capacitor 183 in parallel with a resistor 185 are connected in series. The bias voltage from the source 181 is such as to maintain the thyratron 3NT1 non-conductive. So long as it is non-conductive, neither of the other tyratrons 1NT1 or 2NT1 can conduct. The thyratron 3NT1 is rendered conductive when a potential counteracting the bias is impressed across the network IN1. This thyratron may then conduct, and the thyratrons 1NT1 or 2NT1 in series with it are rendered conductive each in its turn at instants in the half periods of the supply determined by the setting of the phase-shift network PN1. When each of the latter thyratrons conducts, current is supplied through the associated output primary 1PO1 or 2PO1 of the associated output transformer 1TO1 or 2TO1.

Each of the latter transformers is provided with a pair of secondaries 1SO1, 5SO1 and 2SO1, 4SO1. One secondary 1SO1 is connected across the resistor 107 in the control circuit of the firing thyratron FT1 of the ignitron I–1 whose anode 39 is connected to bus L3, and the other secondary 5SO1 is connected across the resistor 103 in the control circuit of the firing thyratron FT5 of the ignitron I–5 whose cathode 41 is connected to bus L2. It is seen that the secondaries 1SO1 and 5SO1 are connected in the control circuits of two ignitrons I–1, I–5, which conduct simultaneously between bus L3 and bus L2. The secondaries 2SO1 and 4SO1 are similarly connected to ignitrons I–2 and I–4, 2SO1 being connected across the resistor 97 in the control circuit of the firing thyratron FT2 of ignitron I–2 and the other secondary 4SO1 being similarly connected across the resistor 113 in the control circuit of the firing thyratron FT4 associated with the ignitron I–4. The leading network N1 thus controls the ignitrons I–1, I–2, I–4 and I–5 with which it is associated. It is seen that the secondaries 1SO1, 5SO1 and 2SO1, 4SO1 are so connected to the control circuits of the ignitrons I–1 and I–5 and I–2 and I–4, respectively, that when transformer 1TO1 is supplied with current, ignitrons I–1 and I–5 are simultaneously rendered conductive and contact current through the primary P; and when transformer 2TO1 is supplied with current, ignitrons I–2 and I–4 are simultaneously rendered conductive and conduct current through the primary.

The following heat-control networks N2 and N3 are substantially similar to the leading network N1. Each includes a common thyratron 3NT2 and 3NT3, respectively, connected in series with a pair of thyratrons 1NT2 and 2NT2, and 1NT3 and 2NT3, respectively, a phase-shift network PN2 and PN3, respectively, including manually actuable control units PHW2 and PHP2, and PHW3 and PHP3 for setting the phase of the network, and output transformers 1TO2 and 2TO2, and 1TO3 and 2TO3, respectively.

The networks PHW2 and PHW3 are set for weld and are in their respective phase-shift circuits when contacts 187 and 189 of relay RWP are open and contacts 191 and 193 closed, and the networks PHP2 and PHP3 are set for post heat and are in their respective phase-shift circuits when contacts 191 and 193 of the relay RWP are open and contacts 187 and 189 closed. The secondaries 3SO2 and 4SO2, and 1SO2 and 6SO2 of transformers 1TO2 and 2TO2, respectively, are connected to control the firing of the ignitrons I–3, I–4, I–1 and I–6 corresponding to the network N2 in the same manner as the corresponding secondaries of the network N1, and the secondaries 2SO3, 6SO3, 3SO3 and 5SO3 are similarly connected to control the firing of the ignitrons I–2, I–6, I–3 and I–5 corresponding to the network N3.

In addition to the above-described components which correspond to like components of network N1, networks N2 and N3, respectively, include a rectifier 195 and 197, and 199 and 201, and a resistor 203 and 205, and 207 and 209, in series with each other and in parallel with the anode 131 and the cathode 133 of each of the thyratrons 1NT2, 2NT2, 1NT3, 2NT3, respectively. The rectifiers 195, 197, 199, 201 are respectively connected in a sense to conduct current from the anodes to the cathodes of the tyratrons 1NT2, 2NT2, 1NT3 and 2NT3, and to provide anode potentials for the thyratrons 3NT2 and 3NT3 so that the latter are conditioned to conduct even if the thyratrons 1NT2, 2NT2, 1NT3, 2NT3 are non-conductive. The resistors 203, 205, 207, 209 limit the current thus conducted to a low value and at the same time provide sufficient drop across the anodes 131 and the cathodes 133 of the corresponding thyratrons to assure that the latter conduct when their control potentials are proper.

The output resistor RO1 of the leading network N1 is connected between the control electrode 143 and the cathode 137 of the thyratron 3NT2 of the first following network N2 through a bias voltage source 211 and a grid resistor 213 in such a sense that when current flows through this resistor, the bias is counteracted and the common thyratron 3NT2 is rendered conductive. Thereafter at proper instants in the half periods of the potential supplied by transformer 2TO2, thyratrons 1NT2 and 2NT2 alternately conduct in series with thyratron 3NT2.

The common thyratron 3NT2 of the first following network N2 is connected to the center tap of the associated supply secondary 1SS2 through an output resistor RO2, and this resistor is connected between the control electrode 143 and the cathode 137 of the common thyratron 3NT3 of the second following network N3 through a bias voltage source 215 and a grid resistor 217 in such a sense that when either one or the other of the thyratrons 1NT2 or 2NT2 conducts in series with thyratron 3NT2, thyratron 3NT3 is rendered conductive. Thereafter, thyratrons 1NT3 and 2NT3 alternately conduct in series with thyratron 3NT3 at present instants in selected half periods of the supply. The thyratrons of the first following network N2 are thus rendered conductive when the thyratrons of the leading network N1 conduct, and the thyratrons of the second following network N3 are rendered conductive when the thyratrons of the first following network N2 conduct. The heat-control networks for all the six ignitrons may thus be rendered effective to control the ignitrons by only one short signal impressed on the control electrode of the common thyratron 3NT1 of the leading network N1.

The Sequence Timer includes a plurality of main thyratrons ST, WT, HT and OT. These thyratrons ST, WT, HT and OT initiate or terminate certain functions of the apparatus and at the same time start the timing operations of the squeeze, weld, hold and off timing networks SN, WN, HN and ON, respectively.

It may be of interest to explain at this point what each of these components does. The squeeze thyratron ST prepares the apparatus for welding by causing the welding electrodes E1 and E2 to compress the material M. This operation occurs during a time interval determined by the squeeze network SN. The timing out of network SN is started by the squeeze thyratron. When the squeeze network times out, the actual welding is started by the weld thyratron WT. This thyratron also starts the timing out of the weld network WN. When the network WN times out, the hold operation is started by the hold thyratron HT. During this operation, the electrodes are held in engagement with the material M until the weld solidifies. The hold thyratron also starts the timing out of the hold network HN. When this network times out, the off operation is started by the off thyratron OT. During this operation the electrodes are disengaged from the material M and the material is set for a second weld. The off thyratron OT starts the off interval by charging the off network; the timing out of the off network is started by the off thyratron OT when the latter is rendered non-conductive.

The anode 219 and the cathode 221 of the squeeze thyratron ST are connected between the buses AL2 and AL1 in a circuit which extends from bus AL2 through the exciting coil 223 of the starting relay SR, the anode 219, the cathode 221, conductor 222, a start switch FS for starting the operation to bus AL1.

The Sequence Timer includes a repeat-non-repeat switch RNR which may be set on "repeat" if the apparatus is to produce a series of welds repeatedly or on "non-repeat" if the apparatus is to produce only one weld. The apparatus will be described in detail here with the switch RNR set on "repeat."

With the switch RNR set for "repeat," the repeated operation of the thyratron ST is controlled from the off network ON. This network consists of a capacitor 225 shunted by a variable resistor 227 and a fixed resistor 229 connected in series. The off network is connected between the control grid 231 and the cathode 221 of the squeeze thyratron ST through a grid resistor 235.

The off network ON is set for timing by the off thyratron OT. The anode 237 and the cathode 239 of this thyratron are connected in a circuit extending from bus AL1 through the starting switch FS, conductor 222, the off network ON, the conductor 241, anode resistor 242, the anode 237, the cathode 239, to the bus AL2.

The squeeze network SN consists of a capacitor 243 shunted by a variable resistor 245 and a fixed resistor 247 connected in series.

The anode 259 and the cathode 260 of the weld thyratron WT are connected in circuit with the input network IN1 (FIG. 1C) to the leading network N1. This circuit extends from one of the auxiliary buses AL2 through a normally open contact 262 of the start relay SR, the conductor 262, the network IN1, a current-limiting resistor 261, a conductor 263, the anode 259, the cathode 260 to the other bus AL1.

It is to be noted that the anode circuit of the weld thyratron WT is maintained open at the contact 262 of the start relay SR. Thus, until the start relay is actuated by the squeeze thyratron, the supply of current to the input network IN1 is prevented. False operation during the warm-up time, when power is first supplied to the apparatus, is thus suppressed.

The weld network WN consists of a capacitor 265 shunted by a pair of variable resistors 267 and 269, one of which may be shunted out by the post-heat switch 270 when there is to be no post heat. This network controls the conductivity of the hold thyratron HT and is connected between the control grid 271 and the cathode 273 of the hold thyratron through a grid resistor 281.

The hold network HN consists of a capacitor 283 shunted by a fixed resistor 285 and a variable resistor 286 connected in series. This network controls the off thyratron OT and is connected between the control grid 287 and the cathode 239 of the thyratron OT through a grid resistor 299.

To produce the sequential operation of the squeeze, weld, hold, and off thyratrons and the corresponding networks, several intermediate operations are required. These operations are produced by anxiliary thyratrons and auxiliary networks which will now be discussed.

One auxiliary thyratron AT2 operates together with the squeeze thyratron ST to start the operation of the sequence timer once the squeeze thyratron is energized. This thyratron charges an auxiliary network AN2 consisting of a capacitor 307 shunted by a resistor 309. This network is connected between the control electrode 311 and the cathode 305 of the thyratron AT3 through a grid resistor 313. The thyratron AT2 is connected in a circuit extending from bus AL2 through the network AN2, a current-limiting resistor 315, the anode 317 and cathode 319 of the thyratron AT2, conductor 222, the starting switch FS, to the bus AL1.

The thyratron AT2 is controlled from the off network ON. The control grid 321 of the thyratron AT2 is connected to the network ON through a grid resistor 325.

The squeeze network SN consists of a capacitor 243 shunted by a variable resistor 245 and a fixed resistor 247 connected in series. The anode-cathode circuit of the thyratron AT3 extends from one auxiliary bus AL1 through the squeeze network SN, a current-limiting resistor 333, the anode 335, and cathode 305 of the thyratron AT3 to the other auxiliary bus AL2.

The squeeze network is connected through the resistor 257 between the control grid 337 and the cathode 339 of still another auxiliary thyratron AT4, which may be called the fourth auxiliary thyratron. The thyratron AT4 is connected in a circuit extending from one auxiliary bus AL2 through another resistance-capacitor network AN3, the pressure switch PS of the welder, a current-limiting resistor 340, the anode 341 and cathode 339 of the thyratron AT4 to the other bus AL1. The network AN3 consists of a capacitor 343 shunted by a resistor 345 and the secondary HS3 of a heater transformer HT3, which introduces a ripple voltage in the network. The heater transformer HT3 supplies heating power for the cathode 305 of a third auxiliary thyratron AT3. The network AN3 is connected through a grid resistor 349 between the control grid 351 and the cathode 347 of a fifth auxiliary thyratron AT5. The secondary HS3 introduces a ripple voltage in the control circuit of thyratron AT5, the purpose of which is explained in Patent 2,533,369 to E. C. Hartwig. The anode-cathode circuit of the fifth auxiliary thyratron AT5 is supplied from the transformer T1 and includes the weld network WN. The circuit extends from one terminal of the secondary S1 through one anode 352 and the cathode 354 of a double diode D2, a current-limiting resistor 356, the anode 353 and cathode 347 of AT5, the weld network WN to the other terminal of the secondary S1.

The thyratron AT5 also controls the weld thyratron through another section 362—354 of the double diode D2. This circuit includes the auxiliary network AN4 consisting of a capacitor 355 shunted by a resistor 357 and the secondary HSW of the heater transformer HTW for the weld thyratron. This network is connected between the control grid 359 and the cathode 260 of the weld thyratron WT through the grid resistor 364. The network AN4 is connected in a circuit extending from the bus AL1 through the network, the anode 362 and the cathode 354 of the double diode D2, the resistor 356, the anode 353 and the cathode 347 of the thyratron AT5 to the bus AL2.

The weld thyratron WT is also controlled from another auxiliary network AN5 which is in the anode-cathode circuit of the hold thyratron HT and is charged when the latter conducts. The network AN5 includes a capacitor 366 shunted by a resistor 368 and is connected between the suppressor grid 370 and the cathode 260 of the weld thyratron WT through a grid resistor 372. When the network is charged, it impresses a blocking bias on the weld thyratron WT, causing it to become non-conductive in spite of the state of the auxiliary network AN4. The anode-cathode circuit of the hold thyratron HT including network AN5 extends from one auxiliary bus AL1 through the network AN5, a resistor 374, the anode 376 and cathode 273 of the thyratron HT to the other bus AL2.

The network AN5 is also connected through a grid resistor 363 between the control grid 365 and the cathode 367 of a sixth auxiliary thyratron AT6. The anode-cathode circuit of this thyratron AT6 is connected in series with the hold network HN in a circuit extending from one of the auxiliary buses AL2 through the hold network HN, a current-limiting resistor 369, the anode 371 and cathode 367 of the auxiliary thyratron AT6 to the other bus AL1.

The usual surge-suppressing capacitors are connected between all of the grids of the main and auxiliary thyratrons which are controlled and their cathodes. These capacitors do not concern the present invention, and they are shown but not labeled.

The networks of the sequence timer have different modes of operation, depending on their functions. Each of the networks is charged through a thyratron and each becomes effective to block the conduction of one or more other thyratrons once their charging thyratrons are rendered conductive. The auxiliary networks AN2, AN3, AN4, AN5 become effective to permit the thyratron or thyratrons which they control to become conductive immediately after their charging thyratrons become non-conductive. The squeeze, weld, hold, and off networks SN, WN, and HN and ON become effective to permit the thyratron or thyratrons which they control to become conductive only after an appreciable time interval predetermined by the setting of a rheostat.

The Post-Heat Unit includes the weld-post-heat relay RWP (FIG. 1C). The exciting coil 373 of this relay is connected in the anode-cathode circuit of a thyratron PT (FIG. 1B), which may be called the post-heat thyratron and which has two branch circuits. One branch circuit extends from the bus AL2 through the coil 373, the post-heat switch 372, the anode 377 and cathode 379 of the thyratron PT to the bus AL1. The other branch circuit extends from the auxiliary bus AL2, normally open contact 262 of the starting relay SR, the resistor 182, a normally closed contact 382 of the weld-post-heat relay RWP, the post-heat switch 372, the anode 377 and cathode 379 of the thyratron PT to the bus AL1. The coil 373 is shunted by a resistor 381 in series with a rectifier 383 so poled as to cause the relay to drop out slowly so that, in spite of the fact that it receives only alternate half waves of current, it does not chatter.

The thyratron PT is controlled from an auxiliary thyratron AT7 through another auxiliary thyratron AT8 which functions as an anode potential phase inverter for the thyratron PT. The anode circuit of the inverter thyratron AT8 is coupled to the grid circuit of the post-heat thyratron PT through a transformer CT, the primary CP of which is connected to the anode 384 of the thyratron AT8 through an anode resistor 386. The secondary CS of the transformer CT is connected between the grid 388 and the cathode 379 of the thyratron PT through a bias 390, which holds the latter off unless thyratron AT8 is conductive, and a grid resistor 392. The secondary CS is so poled that when a half-wave pulse is transmitted through the primary CP, the trailing loop of this pulse produces the positive potential to counteract the bias 390. This loop is in phase with the anode potential of the thyratron PT. The thyratron AT7 is energized from another auxiliary transformer T2 and includes in its anode-cathode circuit the post-heat timing network PN.

Network PN consists of a capacitor 385 shunted by a fixed resistor 387 and a variable resistor 389. This network is connected between the control grid 391 and the cathode 392 of the inverter thyratron AT8 through a capacitor 395 and grid resistor 399.

Between the control grid 401 and the cathode 403 of the auxiliary thyratron AT7, a network AN6 consisting of a capacitor 405 shunted by a resistor 407 in series with the secondary HS7 of the heater transformer HT7 for the thyratron AT7, is connected through a grid resistor 409. The capacitor 405 of the network AN5 is charged from thyratron AT4 when the latter is conductive in a circuit extending from bus AL2, through network AN6, a conductor 411, the resistor 340, the pressure switch PS, the anode 341, and cathode 339 of thyratron AT4 to bus AL1. When the capacitor 405 is so charged, it applies a blocking bias voltage to the thyratron AT7 which becomes non-conductive.

*Operation for FIGS. 1A to 1E*

When the power switch (not shown) for the apparatus is closed, the cathodes of all the thyratrons are heated and the various auxiliary transformers are energized. Before the welding operation is initiated, the weld-no-weld relay RWN is energized by closing the switch 416 connecting its energizing coil to the buses AL1 and AL2 and its contacts 53, 55, 57 and 67 are closed, completing the circuit between the firing thyratrons FT1 to FT6 and the igniters 45 of the ignitrons I-1 to I-6. The ratchet relay RL will have stopped in one of its positions or the other, depending on the last operation before the apparatus when used previously was shut down. In FIG. 1B, this relay is typically shown in a position in which contactor SK1 is energized and contactor SK2 is deenergized. It is noted that the ratchet relay RL has the human attribute of memory, in effect, remembering the polarity of the last half cycle of current before the system was shut down.

The starting switch FS for the apparatus is now open, the anode circuits of the squeeze thyratron ST and the auxiliary thyratron AT2 are open, and these thyratrons are non-conductive. The starting relay SR, the auxiliary relay AR, and the ratchet relay RL are deenergized. Since the second auxiliary thyratron AT2 is initially non-conductive, the capacitor 307 of the second timing network AN2 is discharged. The auxiliary thyratron AT3 is then initially conductive, charging the capacitor 243 of the squeeze network SN. When the network SN is charged, a blocking potential is maintained on the control grid 337 of the auxiliary thyratron AT4 and the auxiliary thyratron is blocked. Because the auxiliary thyratron AT4 is non-conductive, the capacitor 343 of the network AN3 is discharged and the auxiliary thyratron AT5 is conductive. Because the thyratron AT5 is conductive, the capacitor 265 of the weld network WN is charged and the hold thyratron HT is non-conductive. Also, because the thyratron AT5 is conductive, the capacitor 355 of network AN4 is charged and the weld thyratron WT is non-conductive. Because the hold thyratron HT is non-conductive and the capacitor 366 of the network AN5 is discharged, the auxiliary thyratron AT6 is conductive. The capacitor 283 in the hold network HN is then charged and the off thyratron OT is non-conductive. The capacitor 225 in the off network is then discharged and the squeeze thyratron ST and the auxiliary thyratron AT2 can conduct immediately when their anode circuits are closed by means of the start switch FS.

Also, since thyratron WT is non-conductive, capacitor 405 in the network AN6 is discharged and auxiliary thyratron AT7 is conductive, inverter thyratron AT8 is non-conductive, and thyratron PT is non-conductive.

When the work M has been set between the electrodes, the start switch FS is closed to initiate a weld. By the closing of the start switch FS, squeeze thyratron ST and thyratron AT2 are rendered conductive.

The starting relay SR is now actuated by the squeeze thyratron ST, locking itself in at its normally open contact 412 and energizing the solenoid SV through the contact 19 and opening the valve V so that the upper electrode E1 is engaged with the work M. The pressure switch PS now starts to close. At the same time, the auxiliary relay AR is energized through the lower contact 21 of the starting relay SR and through the contact 420 of the relay RWN, energizing the ratchet relay RL and causing the contact of this relay to advance one step. The circuit through the coil 23 of the reversing contactor SK1 is now opened so that this contactor drops out. Its normally open contacts K1 and K2 in series with the primary P of the welding transformer W open, and its normally closed contact K6 closes, closing a circuit through the exciting coil 25 of the other contactor SK2 and energizing the latter so that the reverse circuit through the primary P is closed. The latter reversing contactor SK2 is interlocked with SK1 through its now open lower contact K5 which opens the energizing circuit of the coil 23 of SK1.

The actuation of the reversing contactors SK1 and SK2 takes place at the beginning of the operation of the apparatus before current flows through the welding transformer W so that there is no arcing at the contacts. It is to be noted, however, that this operation does consume a portion of the squeeze interval and thus reduces the speed of operation of the complete apparatus.

When thyratron AT2 conducts, it charges the capacitor 307 of the network AN2, rendering the third auxiliary thyratrons AT3 non-conductive.

When the third thyratron AT3 becomes non-conductive, the capacitor 243 in the squeeze network SN discharges, and after an interval predetermined by the setting of the resistor 245, the potential of the capacitor 243 reaches a magnitude at which the auxiliary thyratron AT4 may conduct and, once the pressure switch PS in its anode circuit closes, it does conduct.

When thyratron AT4 conducts, it performs three functions. First, it charges capacitor 343 of network AN3 to render AT5 non-conductive, and when AT5 stops conducting, capacitor 355 of network AN4 discharges, permitting the weld thyratron WT to conduct. Second, by rendering AT5 non-conductive, it also starts the timing out of the weld network. Third, it charges capacitor 405 of network AN6, rendering thyratron AT7 non-conductive and starting the timing out of the post-heat network PN. So long as the post-heat network PN times out, thyratron PT remains non-conductive. This network PN is so set that it times out before the weld network WN.

The Sequence Timer (FIG. 1A) is supplied from the auxiliary buses AL1 and AL2 which are supplied by the same phase buses L2 and L3 as supply the leading network N1. The weld thyratron WT then conducts in phase with the potential of the conductors L2 and L3. Through the weld thyratron WT, current is now supplied to the resistor-capacitor network IN1 in the control circuit of the common thyratron 3NT1 of the leading heat-control network N1, conditioning this thyratron and the thyratrons 1NT1 and 2NT1 to become conductive. The thyratrons 1NT1 and 3NT1 and 2NT1 and 3NT1 are now rendered conductive at instants predetermined by the setting of the weld rheostat PHW1 during successive opposite half periods of the buses L2 and L3.

For the purpose of this explanation, it may be assumed that the thyratron 1NT1 on the left is the first to become conductive. Energizing potential is then supplied simultaneously through the secondaries 1SO1 and 5SO1 of the output transformer 1TO1 in circuit with this thyratron to the firing thyratrons of two of the ignitrons I-1 and I-5 connected in series with the primary P of the welding transformer W, and current flows upwardly through the contacts K3 and K4, the primary P and the two ignitrons I-1 and I-5.

It is to be noted that both ignitrons I-1 and I-5 must be rendered conductive substantially simultaneously for proper operation of the apparatus. The heat-control network N1 conceived to accomplish this purpose among others is thus an important aspect of our invention.

The conduction of current through the output resistor RO1 in series with the common thyratron 3NT1 conditions the thyratron 3NT2 and the thyratrons 1NT2 and 2NT2 in series with it to conduct, and one or the other of this latter set of thyratrons is rendered conductive at an instant predetermined by the setting of the rheostat PHW2. This rheostat is so set that one set of the thyratrons, which may be assumed to be 2NT2 and 3NT2, conducts approximately ⅙ of a period of the supply after the thyratrons 1NT1 and 3NT1 conduct. At this time, the upper bus L3 has become more negative than the center bus L2 with respect to the bus L1, and ignitron I-6 is subjected to higher potential from the source (L3, L1) than ignitron I-5 (L2, L1). Potential is now supplied through the lower secondary 6SO2 of the output transformer 2TO2 of the following network N2 in the control circuit of the firing thyratron FT6 associated with an ignitron I-6, and the latter (I-6) becomes conductive. For an instant, the three ignitrons I-1, I-5 and I-6 are conductive, but since the last ignitron I-6 to be rendered conductive has impressed between its anode 39 and cathode 41 a higher potential than the ignitron I-5, the latter is rendered non-conductive, and current continues to flow upward through the primary P and the ignitrons I-1 and I-6 from the buses L3 and L1.

The current flow through the output resistor RO2 conditions the thyratrons 1NT3 and 3NT3 and 2NT3 and 3NT3, respectively, to conduct at instants predetermined by the setting of weld rheostats PHW3 of the network N3. This setting is such that the thyratrons 1NT3 and 3NT3 on the left are rendered conductive approximately ⅙ of a cycle after the thyratrons on the right of the first following network N2. At this time, the potential of the center bus L2 has become more positive than the potential of the upper bus L3 with respect to the bus L1. Firing potential is now impressed in the control circuit of firing thyratron FT2 associated with the ignitron I-2, the anode 39 of which is connected to the central bus L2, from the lower secondary 2SO3 of the output transformer 1TO3, and the ignitron I-2 is rendered conductive. Momentarily, now, all three ignitrons I-1, I-6, and I-2 are conductive. But since the anode potential of the last ignitron (I-2) to be rendered conductive is greater than the anode potential of the first ignitron I-1, the latter becomes non-conductive. Current now flows upward through the primary P and through the second and third ignitrons I-2 and I-6 from the buses L2 and L1.

Approximately one half-period of the supply frequency has now passed since the operation started.

The thyratron 2NT1 on the right of the leading network N1 and thyratron 3NT1 now become conductive approximately ⅙ of a period after the thyratron on the left of the second following network N3 has conducted. Now firing potential is supplied by the upper secondary 4SO1, and ignitron I-4 having its cathode connected to the upper bus L3 is rendered conductive at an instant after the potential of this upper bus L3 has become more negative than the potential of the lower bus L1 with respect to the bus L2. The ignitron I-6 then becomes non-conductive, and current is conducted upward through the primary P and the ignitrons I-4 and I-2.

Approximately ⅙ of a cycle later, the left-hand thyratron 1NT2 of the network N2 and thyratron 3NT2 are rendered conductive. Through the upper secondary 3SO2 of the output transformer 1TO2, the ignitron I-3 having its anode connected to the lower bus L1 is rendered conductive at the instant after the lower bus L1 becomes most positive. Current now flows through the primary P and the ignitrons I-3 and I-4.

One-sixth of a cycle later, the right-hand thyratrons 1NT3 of the network N3 and the thyratron 3NT3 are rendered conductive, and through the upper secondary 5SO3 of the transformer 2TO3 in circuit with them, a potential is applied to fire the first of the ignitrons I-5 which was rendered non-conductive shortly after I-6 started to conduct. This ignitron I-5 and the ignitron I-3 now conduct for ⅙ of a cycle, completing one complete cycle of operation of the ignitrons.

Each of the thyratron sets 1NT1, 3NT1; 2NT1, 3NT1; 1NT2, 3NT2; 2NT2, 3NT2; and 1NT3, 3NT3; and 2NT3, 3NT3 becomes non-conductive as the potential across the half of the secondary 1SS1, 1SS2 or 1SS3 from which it is supplied becomes negative. Thus, at the end of the first half-period after the operation started, thyratrons 1NT1 and 3NT1 are non-conductive. At this time also, the weld thyratron WT has stopped conducting. However, the capacitor 183 (FIG. 1C) was charged by the conduction of thyratron WT, and because the charge leaks off in an appreciable time interval, thyratron 3NT1 remains conditioned to conduct for a sufficiently long time to start operation during another ½ period of the source which the thyratrons 2NT1, 3NT1; 1NT2, 3NT2 and 2NT3, 3NT3 conduct. At the end of this second half period, the capacitor 183 is completely discharged and another cycle of operation is only started if the weld thyratron again becomes conductive and supplies current to the network 1N1.

The cyclic operation during complete half periods of the source is positively assured because by action of the ripple impressed by the secondary HSW in the control circuit of the weld thyratron WT it is rendered conductive early in its positive half periods of the supply and conditions the thyratrons of the networks N1, N2 and N3 to become conductive early in the positive half periods of the supply. It is to be noted that this ripple is effective at a time when its effect is not destroyed by a commutation fluctuation.

The above-described cycle of operation may now be repeated a predetermined number of times, depending on the duration of the current flow through the primary of the welding transformer which is desired. The conductivity of the ignitrons I-1 to I-6 in the succession described and at the angles in the half period of the supply determined by the welding rheostats PHW1, PHW2 and PHW3 continues until the post-heat unit comes into operation.

The operation of this unit is initiated when the postheat network PN times out and thyratron AT8 becomes conductive, rendering thyratron PT conductive. The weld-post-heat relay RWP (FIG. 1C) is now energized and closes its normally open contacts 155, 187 and 189 and opens its normally closed contacts 382, 157, 191 and 193. The weld rheostats PHW1, PHW2, PHW3 are now shorted out from the phase-shifting circuits PN1, PN2, PN3 of the networks N1, N2, N3, and the post-heat rheostats PHP1, PHP2, PHP3 become effective in these circuits. It is to be noted that thyratron PT is supplied with anode potential (AL2 to AL1) of the same phase as the weld thyratron WT. It could happen then that as the post-heat interval is about to start, the weld thyratron and the post-heat thyratron are rendered conductive simultaneously. The weld thyratron WT is, however, connected in a circuit including the capacitor 183 and the resistor 261 while the circuit of the thyratron PT includes only resistance, principally resistor 182. Potential then appears across resistor 182 before it appears across capacitor 183. The potential across resistor 182 is of such magnitude and polarity that in conjunction with the bias 181 it blocks the thyratron 3NT1 of the network N1 in spite of any later charge accumulated in capacitor 183.

The blocking potential 182 remains effective until the weld-post-heat relay RWP has operated and opened contact 382. Thus, thyratron 3NT1 is prevented from conducting and starting post-heat operation of the ignitrons during the transition from weld to post-heat in the interval between the initiation of the conductivity of the postheat thyratron and the operation of the relay RWP, and the opening of the contact 382. At the same time, operation of the ignitrons by the weld thyratron is also prevented. This feature is introduced in the apparatus to render the stopping of the weld operation entirely independent of the operating characteristics of the relay RWP. Regardless of these characteristics the weld interval is sharply terminated and the post-heat interval is sharply started only after the relay RWP has completed its operation.

The firing of the ignitrons I-1 to I-6 now continues, but they are fired at instants in the half periods of the supply determined by the setting of the post-heat rheostats PHP1, PHP2, and PHP3, and these rheostats are set so that the ignitrons are rendered conductive substantially later in the half periods than during the welding operation. The succession is the same as during the welding operation, but the firing is such that the current through the primary now decreases, For a better understanding of the operation at this point, it may be assumed that during the cycle of operations described above the current is being conducted between the bus L1 and the bus L2 by ignitrons I–3 and I–5 when the relay RWP is operated and that the positive potential of the upper bus L3 has become greater than the positive potential of the lower bus L1. Because the relay RWP has operated, the firing of a new ignitron, that is, the ignitron I–1, is delayed. The current flow through the ignitrons I–3 and I–5 then continues decreasing substantially.

At an instant predetermined by the setting of the post-heat rheostat PHP1 in the leading heat-control network N1, firing potential is supplied through the lower secondary 1SO1 of the output transformer 1TO1, and the ignitron I–1 is rendered conductive. The ignitron I–5 is now rendered non-conductive, and current flow at a reduced magnitude continues through the ignitrons I–1 and I–6. The reduction process now continues as the other ignitrons are rendered conductive in the succession outlined above.

The conduction continues so long as the weld thyratron WT supplies current to the input network IN1 of the common thyratron 3NT1. This time interval is also determined by the weld network WN in conjunction with the hold thyratron.

It is to be noted that while in accordance with the preferred practice of our invention the networks PHW1 to PHW3 are set to fire the ignitrons I–1 to I–6 early and PHP1 to PHP3 late, these settings could be reversed. Under such circumstances, pre-heat current is supplied during what was called the weld interval and weld current during what was called the post-heat interval. An additional circuit similar to the post-heat circuit could also be provided in such an arrangement for producing an off operation of the relay RWP after the on operation so that there is a pre-heat interval followed by a weld interval which is followed by a post-heat interval.

When the weld network WN times out, the hold thyratron HT becomes conductive. The capacitor 366 in the network AN5 is now charged, and the weld thyratron WT and the auxiliary thyratron AT6 are both rendered non-conductive. The thyratron 3NT1 of the leading heat-control network N1 is now conditioned to become non-conductive. However, the cycle of operation which was started before the weld thyratron WT was rendered non-conductive is completed, and the ignitrons I–1 to I–6 conduct in succession until the end of this cycle. The operation of the heat-control networks is terminated at the end of this cycle and may only be reinitiated during the next welding operation.

It may be well to digress at this point to describe certain general properties of the apparatus. It is to be noted that the operation of the apparatus is synchronous and that the flow of welding current is initiated at the beginning of each weld through the same ignitrons (I–1 and I–5). This condition arises because the leading heat-control network N1 is always actuated first at the beginning of an operation, and since the weld thyratron conducts only during half periods of only one certain polarity, a certain set of thyratrons (1NT1 and 3NT1), those associated with the ignitrons I–1 and I–5, conduct first.

The output transformer 1TO1 is provided with two secondaries 5SO1 and 1SO1 to assure the firing of the two ignitrons I–1 and I–5 simultaneously at the beginning of an operation. The other transformers 2TO1, 1TO2, 2TO2, 1TO3, 2TO3 are also provided each with two secondaries. The two secondaries of the latter transformers are connected in the same manner as the secondaries 5SO1 and 1SO1 to fire ignitrons which are connected in series. Since the ignitrons I–1 and I–5 are always the first to fire, the additional secondaries of the other output transformers are not essential, and apparatus in which they are omitted is within the scope of our invention. The additional secondaries are included as a precaution to assure operation in the situations where the first ignitrons I–1 and I–5 for some accidental reason fail to fire and also for the situation where the heat control is set so low that one or the other of the ignitrons in a succession may fail to fire in its turn. It is to be noted further that the additional secondaries avail flexibility in the selection of sets of ignitrons which are to conduct where the requirements are such that only two or four of the six ignitrons are to conduct.

The description of the operation of the apparatus following the end of the weld time may now be taken up. When the thyratron AT6 is rendered non-conductive, the charging of the hold network HN is interrupted. The capacitor 283 in the hold network HN now discharges for a time interval determined by the setting of its variable resistor 286. During this time interval, the melted metal in the weld hardens. At the end of the interval, the off thyratron OT is rendered conductive, charging the capacitor 225 in the off network ON. Blocking potential is now impressed on the control grid 231 of the squeeze thyratron ST which is rendered non-conductive. The starting relay SR drops out, deenergizing the solenoid SV and permitting the upper electrode E1 to recede from the work W so that it may be moved.

The lower contact 21 of the starting relay SR is now opened, opening the circuit through the coil 37 of the auxiliary relay AR, and through the opening of the contact 35 of the relay AR opens the circuit through the coil 33 of the ratchet relay RL. But, the rod 27 of the ratchet relay RL merely drops back without rotating the ratchet wheel 29.

The control grid 321 of the auxiliary thyratron AT2 also being connected to the off network ON is also rendered non-conductive. The charging of the capacitor in the second network AN2 is now interrupted, and the auxiliary thyratron AT3 is rendered conductive. The auxiliary thyratron AT3 charges the capacitor 243 in the squeeze network SN so that the auxiliary thyratron AT4 is rendered non-conductive. When thyratron AT4 becomes non-conductive three events occur. First, the charging of capaictor 343 in network AN3 stops, and thyratron AT5 is rendered conductive, charging capacitor 355 in network AN4 and conditioning the weld thyratron WT (already non-conductive) to remain non-conductive when the hold thyratron HT becomes non-conductive at a later time. Second, the weld network WN is charged through thyratron AT5. And third, the capacitor 405 (FIG. 1B) is now discharged so that the auxiliary thyratron AT7 is now rendered conductive, and the inverter thyratron AT8 and the post-heat thyratron PT non-conductive so that the relay RWP is deenergized, resetting the networks N1, N2 and N3 for weld rather than post-heat operation.

The hold thyratron HT is now rendered non-conductive, permitting the capacitor 366 in the network AN5 to discharge, and the thyratron AT6 is rendered conductive, charging the capacitor 283 in the hold network HN.

The off thyratron OT is then rendered non-conductive, permitting the capacitor 225 in the off network ON to discharge. This capacitor discharges for a sufficiently long time to permit the work M to be moved.

If now the starting switch FS is still closed, the above-described sequence of operations is repeated. Initially, the starting relay SR is operated to cause the welding electrodes to engage the work M. In addition, its contact 21 causes the auxiliary relay AR to be energized. The ratchet relay RL is then energized and its movable contact 31 is advanced to another position. In this position, the previously energized reversing contactor SK2 is deenergized and the other contactor SK1 is energized. The welding operation now proceeds in the same manner as described above, with the current flowing downward through the primary P of the welding transformer W. This operation may be continued indefinitely with the reversing contactors operating in succession as described above.

The operation with the repeat-non-repeat switch RNR set for non-repeat may now be briefly considered. In this case the suppressor grid 428 of the auxiliary thyratron AT6 is connected through grid resistor 430 and through conductor 241 to the off network ON. In addition, the variable resistor 227 of the off network ON is shunted out so that the time constant of this network is short. Now, when the off thyratron conducts after the weld and hold thyratrons WT and HT, it prevents conduction of the squeeze thyratron ST and the auxiliary thyratons AT2 and AT6 and, thus, prevents a repeat welding operation so long as the start switch FS remains closed. When the start switch is opened, the charging of capacitor 225 in the off network is stopped, and thyratron AT6 becomes conductive, resetting the system for a second operation. This second operation may be carried out when the switch FS is reclosed. And during this operation, the ratchet relay RL is operating, reversing the flow of current through the primary.

Figure 2:
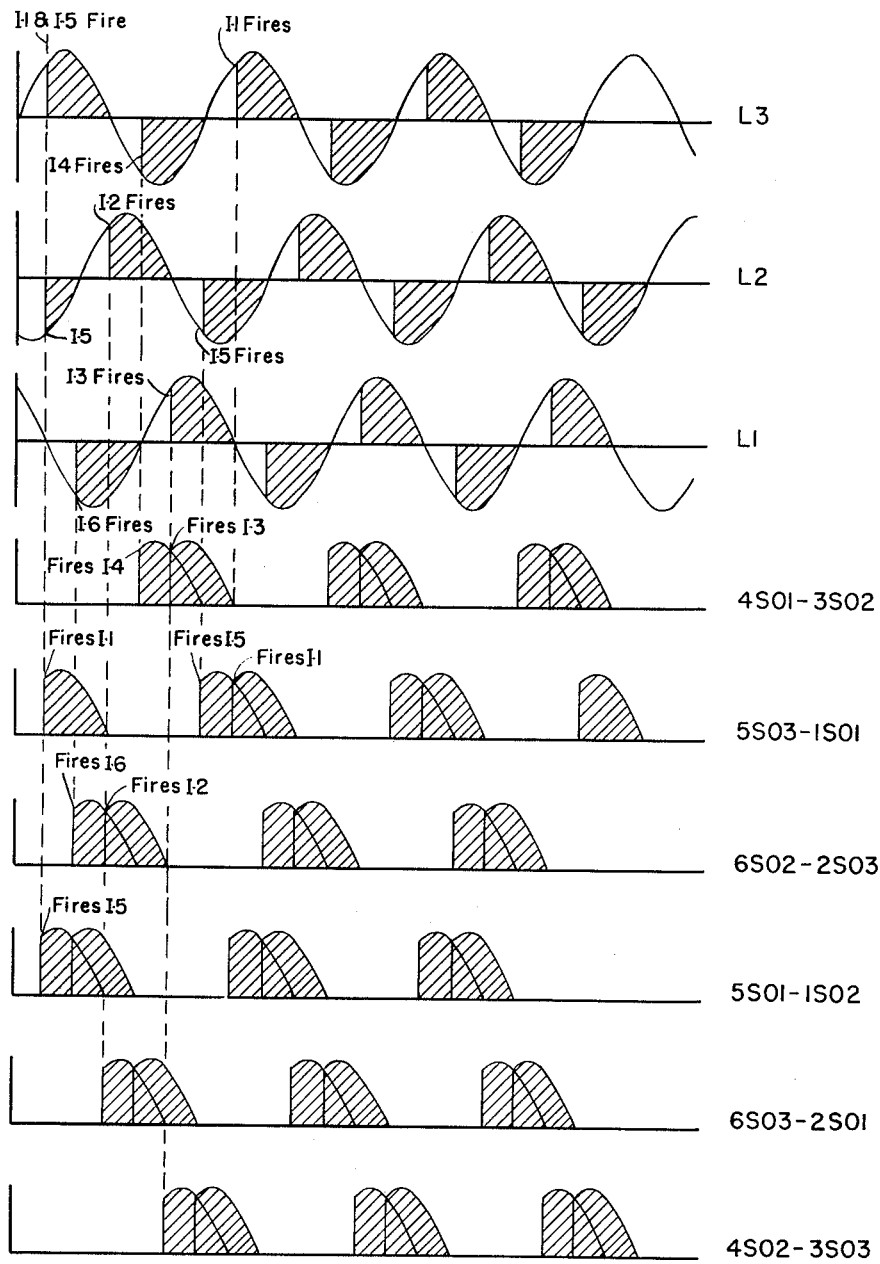
FIGS. 2 and 3 are graphs illustrating the operation of the apparatus shown in FIG. 1.

The cooperation of the heat-control networks and the ignitrons is illustrated in FIG. 2. In each of the graphs, voltage is plotted vertically and time horizontally; the points along the time coordinate, which lie in the same vertical line on FIG. 2, represent the same instant of the time for all graphs.

The curve labeled L3 presents the potential impressed on the ignitrons I–1 and I–4 connected to bus L3; the curve labeled L2, the potential impressed on the corresponding ignitrons I–2 and I–5 connected to bus L2; and the curve L1, the potential on the remaining ignitrons I–3 and I–6 connected to bus L1. The other six curves present the potentials delivered by the secondaries of the output transformers of the networks N1, N2, N3 when the various sets of thyratrons are conductive. The potentials for two secondaries (of different transformers) that conduct in succession are presented on one graph and are correspondingly labeled. The shaded areas under the various waves of the lower six graphs indicate that the corresponding secondaries conduct current. In each case, two secondary symbols appear. The one on the left corresponds to the secondary which carries current first, and the loop of each pair on the same graph, which is on the left, corresponds to the secondary which conducts first. Thus, the loops on the left of the fourth graph from the top show the current for secondary 4SO1, and the other loops of the pairs, the current for secondary 3SO2. Each of the graphs below the fourth presents the potential of the secondaries which conduct just following the conduction of the second secondary represented above. Thus, secondary 5SO3 conducts just after secondary 3SO2.

The shaded areas under the curves L3, L2, and L1 represent the intervals during which current is conducted to or from the corresponding buses. The various curves are labeled to correspond to the manner in which the various ignitrons are fired by the potentials to which the lower six curves correspond. Thus, the potential delivered by secondary 1SO1 is presented as firing ignitron I–1 (curve L3) and ignitron I–5 (curve L2). The curves are largely self-explanatory and no further description is required.

Figure 3:
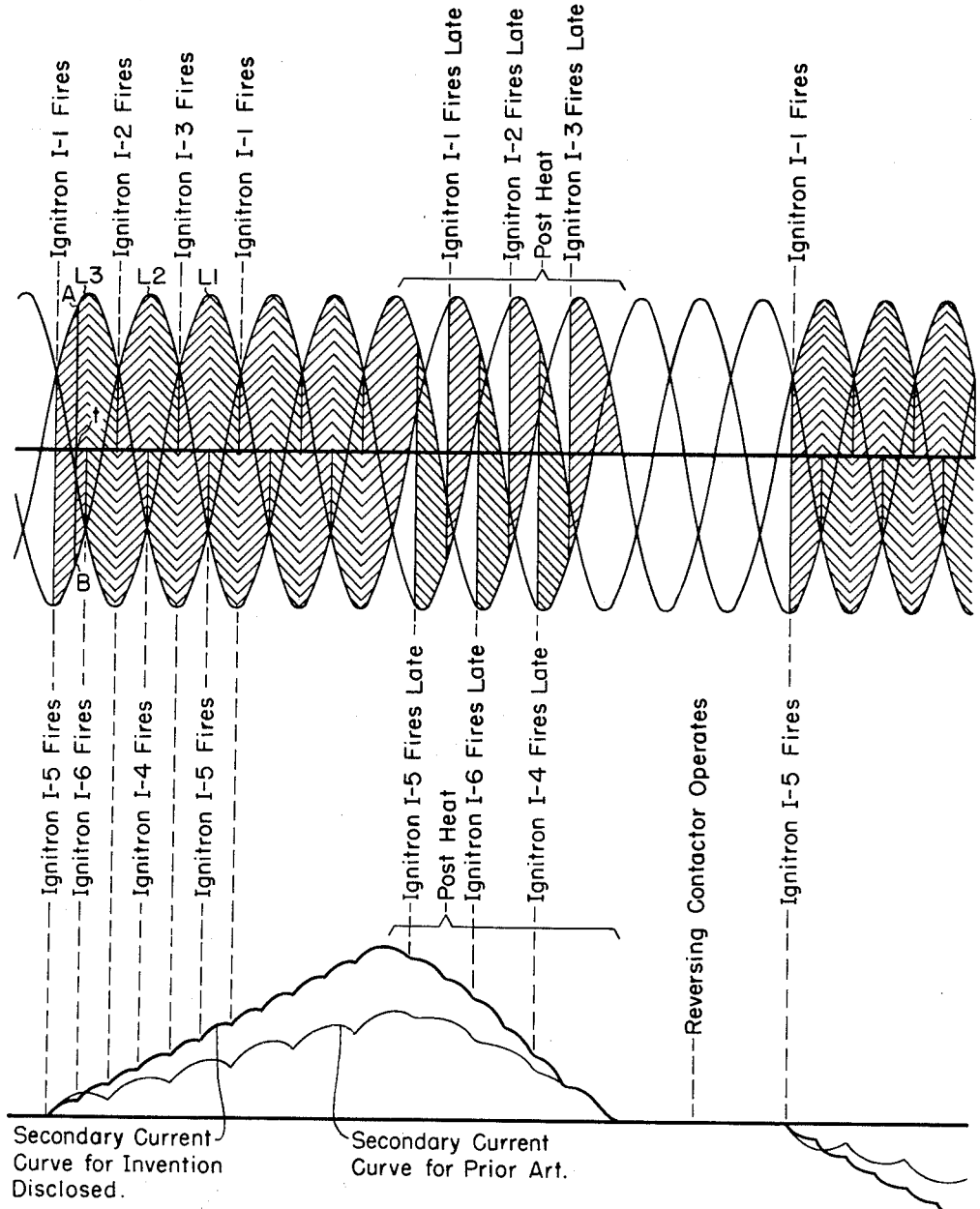

The operation of the apparatus is further illustrated in FIG. 3 in which the upper curve presents the potentials appearing simultaneously between the three buses L3, L2, L1 and an assumed neutral line as a function of time, and the lower curve, the current transmitted through the secondary of the welding transformer as a function of time. With respect to the upper curve, it is to be borne in mind that the effective potential at any instant is represented by the total length of ordinate between points on two loops, one above the other. Thus, the voltage between buses L3 and L2 at any instant is represented by the total length of ordinate between curves L3 and L2 at that instant, that is, by line AB.

For comparison purposes, a second curve is associated with the lower curve. This represents the secondary current as a function of time produced with welding apparatus of the prior art discussed above. For convenience, the prior art curve is shown lighter than the invention curve.

The loops of the upper graph are shaded to indicate conduction, and the shading shows between what buses the conduction is taking place. Thus, the shaded area shows that at instant $t$ the conduction is between L3 positive and L2 negative, that is, through the ignitrons I–1 and I–5. It will be recognized from the shaded areas to the left that the heat-control networks N1, N2, N3 are set to fire the ignitrons very early. The interrupted shaded areas under the loops near the center of the upper graph correspond to the post-heat operation as labeled.

The labeling shows the relationship between the upper loops and the lower heavy curve. The cusps in the lower heavy curve occur at intervals of approximately 1/6 of a period to correspond to the fact that new tubes are rendered conductive at intervals of 1/6 period as the potentials of the different buses L3, L2, L1 interchange in polarity. Because the current is started anew through the successive igniters at intervals of 1/6 of a period, it is built up by each successive ignitron before it decreases to any extent, and the secondary current is high. In addition, the wave form of the secondary current is relatively smooth.

In the prior art apparatus, the current flow through the different sets of ignitrons is initiated at intervals of 1/3 of a period, and the current conducted through the primary of the welding transformer during any intervals drops substantially before the current flow through another set of ignitrons tends to build it up. The secondary current curve is, therefore, not as smooth as the secondary current curve for the apparatus according to our invention and does not rise to as high a magnitude as the curve corresponding to our apparatus. The difference in the secondary currents represented by the lower graph corresponds to a vast difference in the capabilities of the corresponding welding apparatus. Material as, for example, heavy gauge aluminum, bronze, brass, which cannot be welded with prior art apparatus can be welded with our apparatus.

Figure 4:
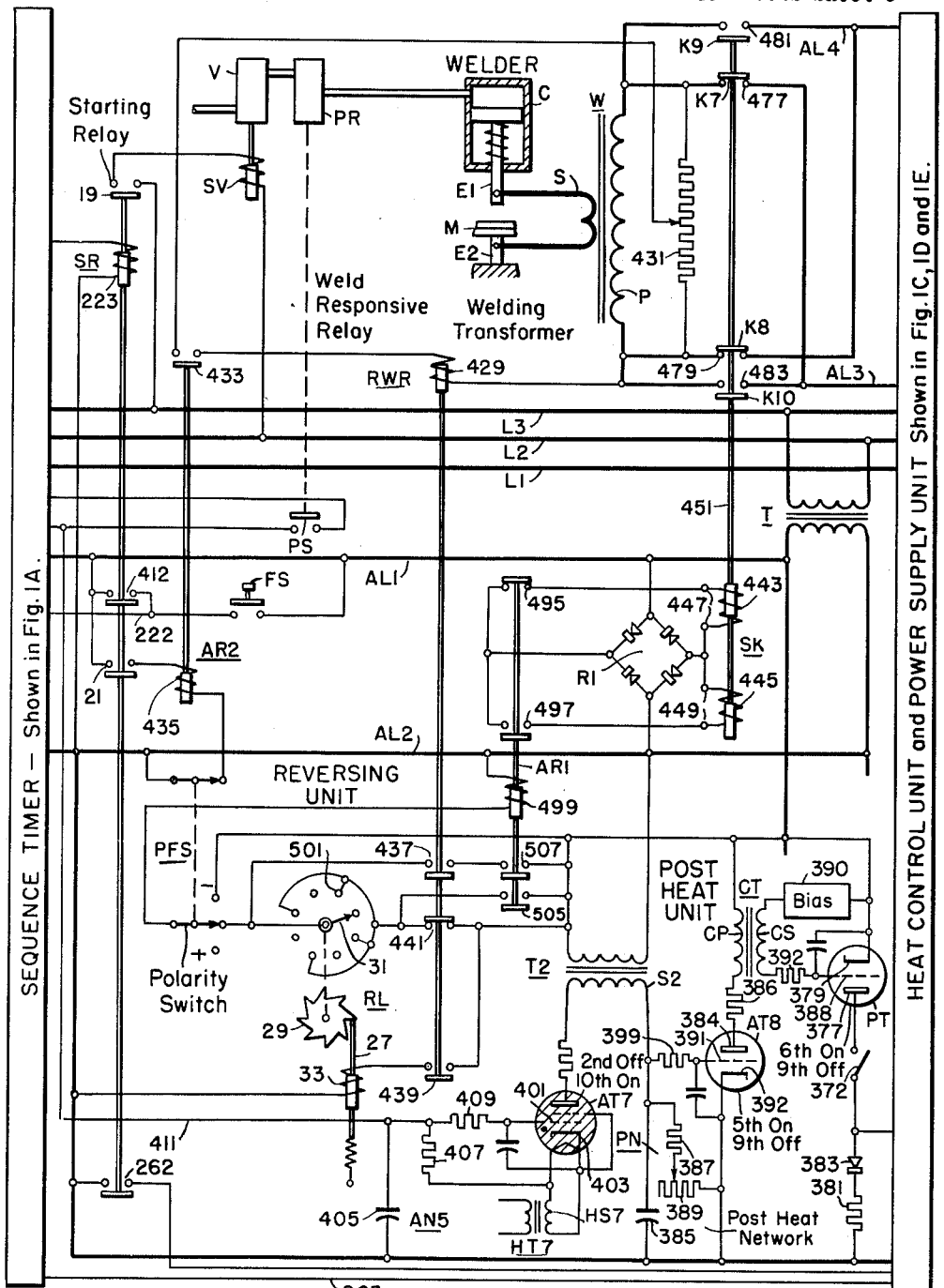
FIG. 4 is a circuit diagram showing the essential features of a modification of our invention.

*Description for FIG. 4*

In the apparatus shown in FIGS. 1A to 1E, the ratchet relay RL and the reversing contactors SK1 and SK2 are operated during the squeeze interval. The squeeze interval must, then, be of relatively long duration, and the rate at which welds can be produced must be correspondingly reduced.

In the apparatus shown in FIG. 4, the operation of the ratchet relay RL is effected while the weld is being fused, that is, while welding current is flowing, and the operation of the reversing contactor is effected just after the weld is fused and the flow of welding current has stopped. The time taken in effecting this operation is thus substantially reduced so that the rate at which welds may be produced is substantially increased. In addition, the reversing is effected with a direct-current contactor SK which is substantially smaller than the alternating-current contactors SK1 and SK2 of the apparatus shown in FIGS. 1A to 1E.

Except for the reversing unit and its associated relay circuit, the apparatus shown in FIG. 4 is substantially the same as the apparatus shown in FIGS. 1A to 1E, and in FIG. 4 only the reversing unit and its associated elements are illustrated. This system includes a starting relay SR and a ratchet relay RL similar to those disclosed in FIG. 1. The ratchet relay RL is controlled from a relay RWR responsive to the current flow through the welding transformer and which may be called a weld-responsive relay. The exciting coil 429 of this relay is connected in a circuit extending from the center tap of a resistor 431 across the primary P through a normally-open contact 433 of an auxiliary relay AR2, the coil 429, to the lower terminal of the resistor. The coil 435 of the auxiliary relay AR2 is connected between the buses AL1 and AL2 through the contact 21 of the relay SR and the polarity switch. The normally-open contact 433 of the relay AR2 is open between welding operations, that is, during the off time, and prevents a false operation of the welding-responsive relay RWR by reason of a surge following a weld.

The weld-responsive relay RWR has two normally-open contacts 437 and 439 and one normally-closed contact 441. One of the normally-open contacts 439 is connected to close the circuit through the coil 33 of the ratchet relay RL when it (439) closes, that is, while welding current is flowing through the primary P. The other contacts 437 and 441 cooperate to prevent actuation of the D.C. contactor SK and the opening or the closing of its contacts K7, K8, K9, and K10 while welding current is flowing.

Figure 6:
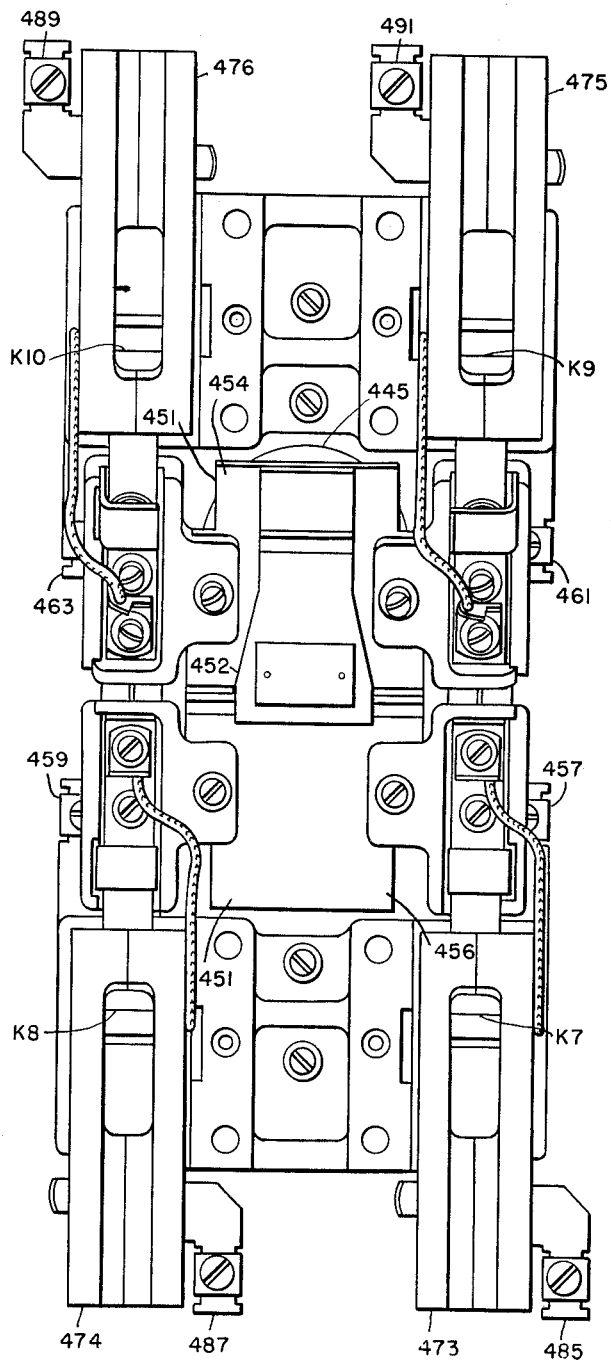
FIG. 6 is a plan view in front elevation of a direct-current reversing contactor which preferably is used as one feature of our invention.
Figure 7:
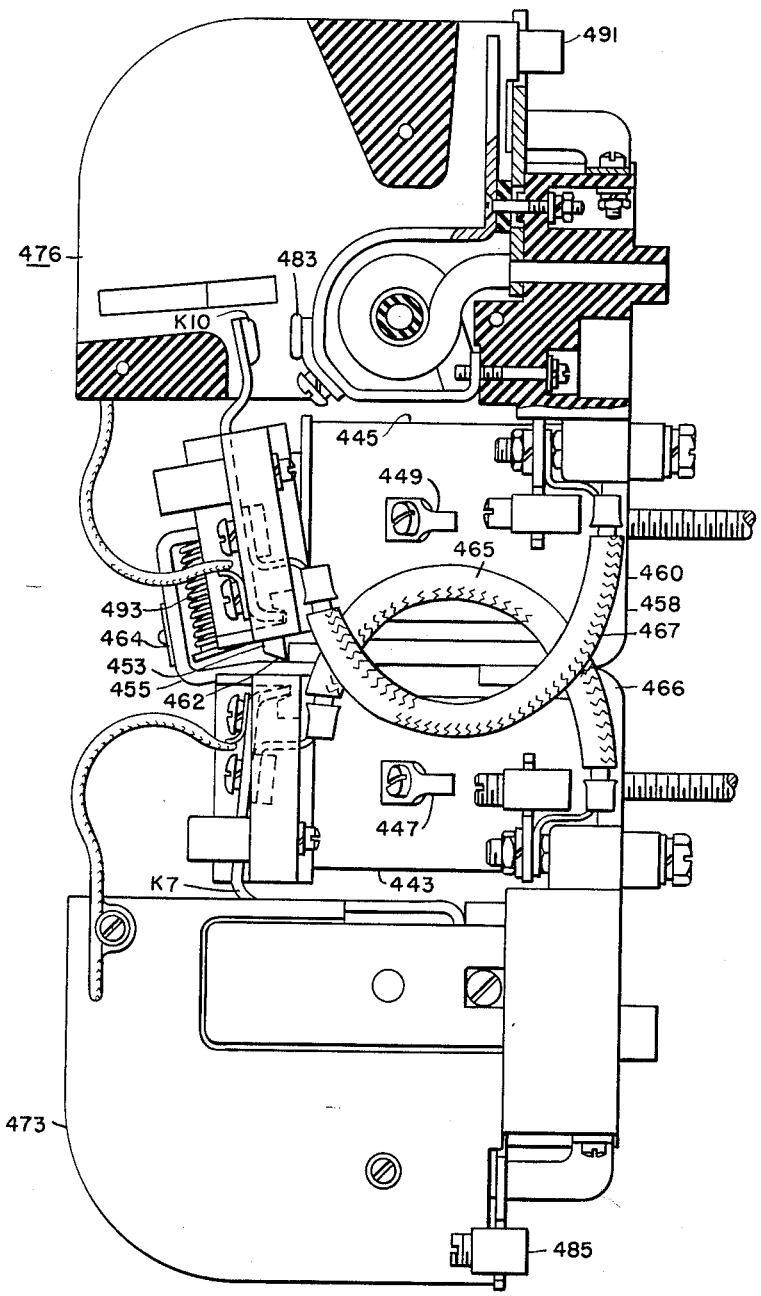
FIG. 7 is a view in side elevation with a section broken away of this contactor.

The reversing contactor SK is shown in detail in FIGS. 6 and 7. It includes a pair of coils 443 and 445 suitably mounted on a frame. Each coil is provided with suitable terminals 447 and 449. There are similar terminals (not shown) on the opposite sides of the coil. Current is supplied to each coil through the terminal (447 or 449) and the corresponding one on its opposite side.

A movable armature 451 is associated with the coils, and this armature is in one piece but has two arms 454 and 456 and is pivotally supported between these arms on frame 452 about pivot 453.

The frame 452 includes a right angle bracket 458 to one side 460 of which one coil 445 is secured by its core (not shown). The other side 462 of this bracket 482 serves as a support for generally U-shaped bracket 464. The recess formed between the end of the side 462 and the side of the U-shaped bracket 464 adjacent thereto serves as a bearing 455 for the pivot 453. The bracket 464 has a slot through which the portion 456 of the armature 451 actuable by the coil 443 projects. The latter coil 443 is mounted on one side of a short right angle bracket 466 secured to the side 462 of the bracket 458.

The armature 451 carries the four movable contacts K7, K8, K9 and K10 which are resiliently secured thereto. Because the armature is in one piece the arms and the contacts which they carry are mechanically interlocked. The contacts are connected to corresponding terminals 457, 459, 461 and 463 through two pairs of loop conductors 465 and 467 (only one pair shown). The contacts K7 to K10 extend into arc chutes 473, 474, 475, 476 where they engage cooperative fixed contacts 477, 479, 481, and 483 (shown symbolically in FIG. 4). The fixed contacts 477 to 483 are connected through strips in the chutes 473 to 476 to terminals 485, 487, 489 and 491.

The armature and movable contacts K7 to K10 are biased to a position in which K7 and K8 are closed by a spring 493 which is mounted in bracket 464 and biases the armature 451 against this bracket. When the coil 443 corresponding to contacts K7 and K8 is energized, this set is sealed into firm engagement with the corresponding fixed contacts 477 and 479. When the other coil 445 is energized, the armature is pivoted, carrying the movable contacts K9 and K10 into engagement with corresponding fixed contacts 481 and 483 and moving contacts K7 and K8 from the fixed contacts 477 and 479.

The ratchet relay RL controls an auxiliary relay AR1 which when in the deenergized position connects the coil 443 of the D.C. contactor SK to rectifier R1 through normally closed contact 495 and when in the energized position connects the other coil 445 through normally open contact 497 to rectifier R1. As the ratchet relay is actuated, its movable contactor 31 moves alternately to a position in which it is connected in circuit with the coil 499 of the auxiliary relay AR1 through a set of contacts 501 and to a position in which it is not connected in this circuit.

The apparatus shown in FIG. 4 also includes provisions which are sometimes desirable in welding materials of different thicknesses. In the welding of such materials, it is desirable to transmit currents of only one polarity or the other through the material to be welded. For this purpose, a polarity selector switch PFS is provided. In its center position, this switch is set for alternate half cycles of both polarities. In its upper position, it is set for current flow of negative polarity and in its lower position for current flow of positive polarity.

As can be seen from the drawing, the switch PFS in the upper position maintains the auxiliary relay AR1 energized continuously by closing a circuit through its coil 499, and in the lower position, the switch PFS maintains the circuit open continuously and the relay AR1 deenergized. In these positions, then, the contactor SK is maintained either with its one coil 445 energized (upper position of PFS) or with its other coil 443 energized (lower position of PFS), depending on the polarity of the welding current desired. The polarity switch PFS is actually shown in a midposition in which the polarity of the current transmitted through the primary alternates.

*Operation for FIG. 4*

When the power switch (not shown) for the system is closed, the components described as energized in the discussion of FIGS. 1A to 1E are energized. In addition, power is supplied to the rectifier R1, and depending on the position of the ratchet relay RL, the auxiliary relay AR1 is energized or deenergized and the D.C. contactor SK is in one position or the other. In FIG. 4, the ratchet relay RL is set so that the auxiliary relay AR1 is deenergized and the D.C. contactor SK is in the position in which its contacts K7 and K8 are closed. In this position, current flows downward through the primary P when the ignitrons I–1 to I–6 FIG. 1) are energized.

The operation of the apparatus shown in FIG. 4 is initiated by the closing of a start switch FS. The operation of the sequence timer is then initiated and when the squeeze thyratron ST is rendered conductive, relay SR is actuated, energizing relay AR2 through contact 21. At the contact 433, a circuit is closed through the coil 429 of the weld-responsive relay RWR, but this relay remains deenergized because current is not as yet flowing through the primary P. The closing of the contact 412 of the starting relays SR during the squeeze interval of the sequence timer serves to lock in the relay SR between buses AL1 and AL2 during the welding operation.

As in the case of the apparatus shown in FIGS. 1A to 1E, current flows through the welding transformer W during the welding interval of the sequence timer. By reason of the flow of current, the weld-responsive relay RWR is energized, and by the closing of its normally-open lower contact 439, the ratchet relay RL is energized, advancing its movable contact 31 one notch. This movable contact is now in a position to energize the auxiliary relay AR1, but the latter is not energized at this time because the normally-closed contact 441 of the weld-responsive relay is open.

At the end of the weld interval, the current flow through the primary P is stopped. The weld-responsive relay RWR is now deenergized, reopening its lower contact 439 and reclosing its normally-closed contact 441. The reopening of the lower contact 439 causes the rod 27 of the ratchet relay RL is recede and has no effect on the position of the movable contact 31 of the ratchet relay. The reclosing of the normally-closed contact 441 causes the auxiliary relay AR1 to be energized. This relay is locked in its energized position through its lowermost now-closed contact 505. The heretofore-energized coil 443 of the D.C. contactor SK is now deenergized at contact 495, and the heretofore-deenergized coil 445 is energized at contact 497. The contactor SK thus reverses the connections between the primary P of the welding transformer W and the auxiliary buses AL3 and AL4. The above-described operations take place during the hold interval of the sequence timer.

At the end of the hold interval, the starting relay SR drops out, and the relay AR2 also drops out. But this does not affect the auxiliary relay AR1 which remains energized through the normally closed contact 441 of the weld-responsive relay RWR (and also through its own contact 505), and the D.C. contactor SK remains in its latest position.

If the operation of the apparatus should now be stopped for the time being and reinitiated at a later time, the ratchet relay RL will remain in the last position in which it was latched. When the power is again supplied to the welder, the auxiliary relay AR1 will again be energized, and the D.C. contactor will be reverted to the position in which it had been when the operation was stopped. Thus, the ratchet relay has the human attribute of memory.

Another welding operation may be initiated by closing the start switch after the above-described operation or by holding it closed at the end of that operation. In either event, the above-described steps are repeated. The auxiliary relay AR2 is actuated during the squeeze interval, preparing the energizing circuit of the weld-responsive relay RWR for operation. During the weld interval, current flows through the primary P, and the relay RWR is again energized. The normally closed contact 441 of this relay now opens, but the auxiliary relay AR1 remains energized through its normally-open contact 505, which is now closed. The contact 31 of ratchet relay R then advances another step to a position in which the circuit through this contact 505 is opened. But, by the time this happens, the normally-open contact 437 of the weld-responsive relay RWR is closed, and the auxiliary relay AR1 remains locked in through this contact and through its own now-closed contact 507. Thus, the reversing contactor SK remains in its last position unaffected, and contacts K9 and K10 remain closed.

The welding now proceeds in the manner described with current flowing through the primary P in a downward direction. At the end of the weld interval, the weld-responsive relay RWR is deenergized. Since the ratchet relay RL is now in a position in which the circuit through the coil 499 of the auxiliary relay AR1 and the normally closed contact 441 of the weld-responsive relay RWR is open, the auxiliary relay AR1 is deenergized, and the D.C. contactor SK reverts to its first position with contacts K7 and K8 closed. The apparatus is now reset for a new operation during which the current will flow upward through the primary P.

Figure 5:
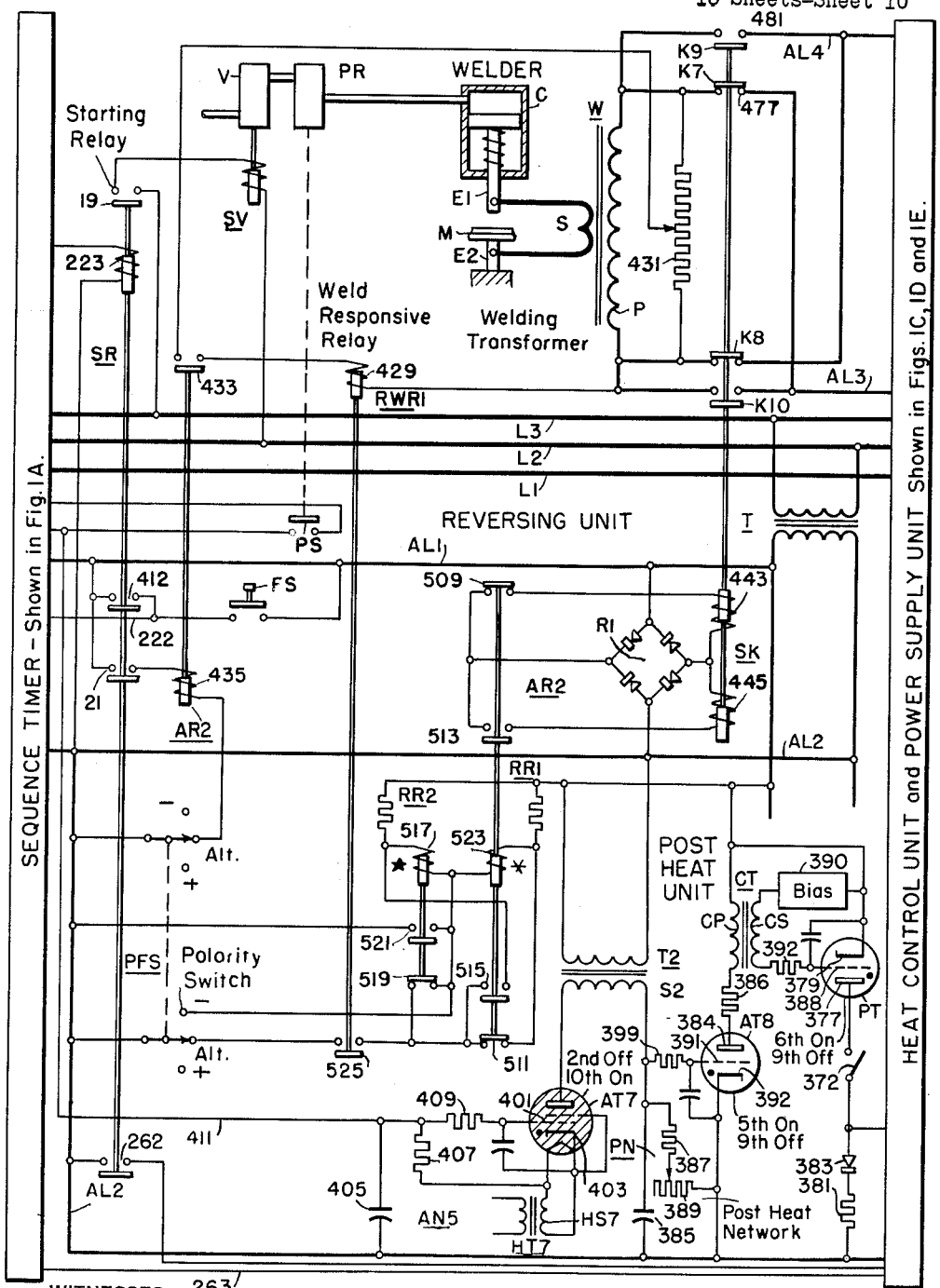
FIG. 5 is a circuit diagram showing a further modification of our invention.

Description for FIG. 5

Where the memory function is not essential, the system shown in FIG. 5 may be used. In this system, the ratchet relay RL is replaced by a pair of relays RR1 and RR2 connected to produce the desired sequence. One of these relays RR1 has two normally-closed contacts 509 and 511 and two normally-open contacts 513 and 515. Two of these contacts 509 and 513 are connected in series with a coil 443 and 445, respectively, of the D.C. contactor SK and the rectifier R1. The others 511 and 515 are connected in circuit with the coil 517 of the other relay RR2. The latter relay RR2 has one normally-closed contact 519 and one normally-open contact 521, which are connected in circuit with its coil 517 and with the coil 523 of the relay RR1. The first relay RR1 is a so-called break-before-make relay, and the second relay RR2 is a so-called make-before-break relay. The first relay RR1 drops out immediately when its coil 523 is deenergized but pulls in a short time interval after its coil is energized, and the second relay RR2 drops out a short time after its coil is deenergized, but pulls in immediately when its coil is energized.

Except for the two relays just described, FIG. 5 is substantially the same as FIG. 4.

Operation for FIG. 5

Except for the relays RR1 and RR2 and their associated circuit, the apparatus shown in FIG. 5 operates in the same manner as the apparatus shown in FIG. 4. The operation of the relays RR1 and RR2 is started by the closing of a normally open contact 525 of a weld-responsive relay RWR1. It is only necessary then that the operation from the time that the weld-responsive relay is energized be described.

During the weld time of the sequence timer, then, when current is supplied to the welding transformer W, and the weld-responsive relay RWR1 is energized, the normally-open contact 525 is closed. Current is now supplied from bus AL2 and bus AL1 through this contact 525 and through the normally-closed contact 519 of relay RR2 to the coil 517 of this relay. This relay (RR2) is actuated and its coil 517 is locked in the energized condition through its now closed contact 521, the other relay RR2 remaining unaffected because its coil 523 is short-circuited through its normally-closed contact 511, the now-closed contact 525, and the now-closed contact 521 of the first-mentioned relay RR2. At this time, then, the contacts 509 and 511 of relay RR2 remain in the position shown, and contacts K7 and K8 remain closed so that weld current may flow unobstructed. At the end of the weld time, the weld-responsive relay RWR1 is deenergized, opening the shunt circuit across the coil 523 of the relay RR1 at contact 525. This relay RR1 is then energized through the now-closed contact 521 of the other relay RR2, and both relays are now energized. The actuation of the relay RR1 closes the normally-open contact 513 in circuit with the coil 445 of the D.C. contactor and opens the normally closed contact 509 in circuit with coil 443. The originally energized coil 443 is deenergized, and the originally deenergized coil 445 is energized, reversing the connections between the primary P of the welding transformer W and the buses AL3 and AL4 to which the ignitrons I–1 to I–6 are connected.

So long as power is supplied to the apparatus, the relays RR1 and RR2 remain thus energized, and the contactor SK remains in the last-described position until the weld time of the next sequence operation of the sequence timer, which takes place during the next weld. At this time, the relay RWR1 is again energized, closing its contact 525. The coil of the relay RR2 is now short-circuited through the contact 525, the now-closed contact 515 of the relay RR1, and the now-closed contact 521 of the relay RR2. The relay RR2 becomes deenergized, but the relay RR1 remains energized through the contact 525 and its now-closed contact 519 until the end of the weld. At the end of the weld, the weld-responsive relay RWR1 is deenergized, and its normally-open contact 525 reopens, opening the circuit through the coil of the relay RR1 and resetting this relay for another operation. At this point, the originally energized coil of the D.C. contactor is again energized, and the last-energized coil is deenergized.

Description for FIG. 8

The apparatus in accordance with our invention is useful for many purposes. One purpose which has presented difficulties heretofore to which it readily applies is the welding together of aluminum rods into coextensive units. For this purpose, we provide the apparatus shown in FIG. 8 which comprises tongs Y, the fingers 527 and 529 of which are insulated from each other at the pivot 531. One of the fingers 529 is resiliently mounted so that it may apply pressure resiliently to material M interposed between the fingers. Across the fingers 527 and 529, the secondary S of a transformer W, such as is discussed in the foregoing description, is connected. The primary P of the transformer is connected in circuit with a control K, such as described in the foregoing description. Where the current required for welding is substantial, this control may include the ignitrons I-1 to I-6. In certain circumstances, the ignitrons I-1 to I-6 may be omitted, and the welding current may be supplied through thyratrons connected similarly to the firing thyratrons I-1 to I-6. It is to be noted that the firing thyratrons FT1 to PT6 are connected in this manner. The control is set into operation by actuation of a microswitch MS mounted on the handle for finger 527 by a cam CM mounted on the handle for finger 529. This switch MS corresponds to the foot switch FS shown in the other views.

*Operation for FIG. 8*

The rods M1 and M2 to be welded are arranged between the electrodes in the manner illustrated in section in FIG. 8 and in elevation in FIG. 9a. The fingers 527 and 529 are then closed on the rod, and as they are closed, the micro-switch MS is operated to start one welding operation. During the weld, the rods are formed into a unit as shown in FIG. 9b, the micro-switch then automatically opening the weld circuit.

*General Comments*

Considering the purpose which it serves, the apparatus shown in the drawings and disclosed above is of relatively simple structure. With only six ignitrons and their associated control components, it accomplishes the purpose which would, in accordance with the teachings of the prior art, require twelve ignitrons and a correspondingly large number of other components. In addition, the welding transformer has only one primary winding rather than three, as has the transformer of the prior art apparatus discussed, and this single primary winding is in our system connected directly to the supply buses and not through a supply transformer. In spite of its relative simplicity, the apparatus according to our invention has given satisfactory performance in the welding of materials which could not be satisfactorily welded before our invention.

In one respect this apparatus has been particularly advantageous. It is to be noted that the magnitudes of the electric currents of opposite polarity supplied to the welding transformer W is controlled by the same electronic components; only the position of the reversing contactor changes. Variations in the characteristics of the electronic components such as aging, therefore, affect the currents of opposite polarity in precisely the same way, and these currents are of precisely the same magnitude regardless of the variation. Saturation of the welding transformer is thus entirely avoided.

We claim as our invention:

1. Apparatus for controlling the polarity of current flow from a supply through a load to which current pulses of opposite polarity are supplied in succession, comprising, in combination, reversing means interposed between said supply and said load, said reversing means being operable from one position in which it permits current of one polarity to flow through said load to another position in which it permits current of the opposite polarity of flow through said load, means, including a latching relay, responsive to a first event for conditioning said reversing means to be actuated from said one position to the said other position, and means responsive to a second event for actuating said reversing means, from said first position to said second position, after it has been so conditioned.

2. Apparatus for controlling the polarity of current flow from a supply through a load to which current pulses of opposite polarity are supplied in succession, comprising, in combination, reversing means interposed between said supply and said load, said reversing means being operable from one position in which it permits current of one polarity to flow through said load to another position in which it permits current of the opposite polarity to flow through said load, means including switch means which is actuable from one position to another on the initial application of power thereto and thereafter remains in its latest position independently of the continuation or interruption of power, responsive to a first event for conditioning said reversing means to be actuated from said one position to said other position and means responsive to a second event for actuating said reversing means, from said first position to said second position, after it has been so conditioned.

3. In combination main switch means having a first position and a second position; a circuit for actuating said main switch means, said main switch means being in said first position when said circuit is closed and in said second position when said circuit is open; a latching relay having a first set of contacts and a second set of contacts and including means to be actuated to close the contacts of said first and second sets alternately; means for connecting the contacts of said first set only in said circuit; relay means including a first normally open contact to be closed to actuate said ratchet relay, a second normally open contact connected in, and adapted to close, said circuit independently of said contacts of said first set and a normally closed contact in said circuit in series with said contacts of said first set; first and second auxiliary switch means actuable by said circuit and in an open position when said circuit is open and in a closed position when said circuit is closed; means for connecting said first auxiliary switch means in said circuit in series with said second normally open contact and means for connecting said second auxiliary switch means in said circuit in parallel with said normally closed contact.

4. Apparatus for controlling the polarity of current flow from a supply through a load to which current pulses of opposite polarity are supplied in succession, comprising, in combination, reversing means interposed between said supply and said load, said reversing means being operable from one position in which it permits current of one polarity to flow through said load to another position in which it permits current of the opposite polarity to flow through said load, means including switch means, which is actuable from one position to another on the initial application of power thereto and thereafter remains in its latest position independently of the continuation or interruption of power, responsive to the initiation of current flow through said load for conditioning said reversing means to be actuated from said one position to said other position and means responsive to the termination of said current flow through said load for actuating said reversing means, from said first position to said second position, after it has been so conditioned.

5. In combination a welding transformer having a primary which in effect has only a pair of terminals; a first plurality of electric discharge paths each defined by an anode and a cathode; a second plurality of electric discharge paths each defined by an anode and a cathode and means selectively operable to connect the anodes of said first plurality respectively either to one of said terminals or to the other of said terminals and the cathodes of said second plurality respectively either to said other of said terminals or to said one of said terminals.

6. In combination a first electric discharge device having a control electrode; a first control circuit for said device; a second control circuit for said device; a relay having a first normally closed contact, a second normally closed contact, and a normally open contact; means including said first normally closed contact for connecting said first circuit to said control electrode when said contact is closed; means including said normally open contact for connecting said second circuit to said control electrode when said last-named contact is closed; a second electric discharge device; means for connecting said second device to actuate said relay when said second device is conducting; and connections between said second device, said second contact and said first device for maintaining said first device non-conducting so long as said second device is conducting and said second contact is closed.

7. Welding apparatus for supplying welding current pulses having weld and post heat components and including a welder, means for supplying current to said welder in pulses each of which includes a weld component and a post heat component, a post heat timer for timing the interval between the initiation of the supply of the weld component of current and the initiation of the supply of the post heat component of current, and a sequence timer including first means for actuating said current supply means to supply current for a predetermined time interval and second means for actuating said actuating means, said second means being itself actuated a predetermined time interval before the first means actuates said supply means to supply current, said welding apparatus being characterized by means connecting said second means to said post heat timer for starting the timing operation of said timer on actuation of said second means.

8. Welding apparatus for supplying welding current pulses having at least two components, an initial component and a succeeding component, and including a welder, means for supplying current to said welder in pulses each of which includes said initial component and said succeeding component, an interval timer for timing the interval between the initiation of the supply of said initial component of current and the initiation of the supply of said succeeding component, and a sequence timer including first means for actuating said current supply means to supply current for a predetermined time interval and second means for actuating said actuating means, said second means being itself actuated a predetermined time interval before the first means actuates said supply means to supply current, said welding apparatus being characterized by means connecting said second means to said interval timer for starting the timing operation of said timer on actuation of said second means.

9. Welding apparatus according to claim 8 characterized by the fact that the first means includes a first electric discharge device which is rendered conducting to initiate the supply of welding current to the welder and the second means also includes a second electric discharge device which is rendered conducting to actuate the first means and to start the timing operation of the interval timer, the second device being rendered conducting a predetermined time interval before the first device.

10. In combination, a load impedance having first and second terminals; a first supply conductor; a first contact connected between said first terminal and said first conductor; a second contact connected between said second terminal and said first conductor; a second supply conductor; a third contact connected between said first terminal and said second conductor; a fourth contact connected between said second terminal and said second conductor; a first plurality of electric discharge paths each defined by an anode and a cathode; means connecting said cathodes to said first conductor in series with said first and second contacts; a second plurality of electric discharge paths each defined by an anode and a cathode; means connecting said last-named anodes to said second conductor in series with said third and fourth contacts; means for maintaining said first and third contacts closed and said second and fourth contacts open; means for rendering said paths conducting in a predetermined succession for a predetermined time interval, while said first and third contacts remain closed and said second and fourth contacts remain open, a path of the first plurality and a path of the second plurality being alternately rendered conducting to supply current to said load impedance; means for opening said first and third contacts and closing said second and fourth contacts; and means responsive to current flow through said load impedance for actuating said opening and closing means after said current flow has ceased.

11. Apparatus for supplying power from first and second buses of an alternating supply source to a load comprising in combination, a first conductor; a second conductor; means for connecting said load between said conductors; a first electric discharge device having an anode, a cathode and a control electrode, said anode being connected to said first bus and said cathode to said first conductor; a second electric discharge device having an anode, a cathode and a control electrode, said last-named cathode being connected to said second bus and said last-named anode being connected to said second conductor; a phase-shift network; and means connecting said network to the respective control electrodes and cathodes of both said devices for impressing potentials between the said respective control electrodes and the cathodes to render said devices conducting simultaneously.

12. Apparatus according to claim 11, characterized by the fact that the connecting means includes an output transformer having a pair of secondaries each connected between a control electrode and a cathode of one of the discharge devices, and the network includes means for supplying potential to the primary of said output transformer at a predetermined instant in the half periods of the supply of said source.

13. Apparatus for supplying power from a source to a resistance welder of the type including welding electrodes, means for engaging said electrodes under pressure with material to be welded and for disengaging said electrodes from said material, and means for supplying current to weld said material while it is engaged with said electrodes, the said apparatus comprising in combination, means connected to said source for deriving current impulses of only one polarity from said source; a current-reversing contactor having contacts; means interposed between said deriving means and said supply means for supplying current from said deriving means to said supply means through said contacts; a sequence timer cooperative with said welder and said deriving means and including at least a squeeze component, a weld component, a hold component and an off component each connected to cause the cooperative actuation of said welding electrodes and said current deriving means at predetermined timed intervals during successive squeeze weld, hold, and off operations, said components being actuable automatically in succession once operation of said sequence timer is initiated by actuation of said squeeze component; means for initiating operation of said sequence timer; and means actuable by said initiating means for operating said contactor during the squeeze interval before said weld component is actuated.

14. Apparatus for supplying power from a source to a resistance welder of the type including welding electrodes, means for engaging said electrodes under pressure with material to be welded and for disengaging said electrodes from said material and means for supplying current to weld said material while it is engaged with said electrodes, the said apparatus comprising in combination, means connected to said source for deriving current impulses of only one polarity from said source; a current-reversing contactor including contacts; means interposed between said deriving means and said supply means for supplying current from said deriving means to said supply means through said contacts; a sequence timer cooperative with said welder and said deriving means and including at least a squeeze component, for causing said electrodes to engage said material during a predetermined time interval and a weld component for causing current to flow through said electrodes at the end of said time interval while said electrodes are engaged as aforesaid, said squeeze and weld components being automatically actuable in succession once operation of said timer is initiated by actuation of said squeeze component; means for initiating operation of said timer; and means actuable by said initiating means for operating said contactor during said interval before said weld component is initiated.

15. Apparatus for supplying power from a source to a resistance welder of the type including welding electrodes; means for engaging said electrodes under pressure with material to be welded and for disengaging said electrodes from said material and means for supplying current to weld said material while it is engaged with said electrodes, the said apparatus comprising in combination; means connected to said source for deriving current impulses of only one polarity from said source; a current-reversing contactor having contacts; means interposed between said deriving means and said supply means for supplying current from said deriving means to said supply means through said contacts; a sequence timer cooperative with said welder and said deriving means and including at least a squeeze component, for causing said electrodes to engage said material during a predetermined time interval, a weld component for causing current to flow through said electrodes at the end of said time interval for a second time interval while said electrodes are engaged as aforesaid, a hold component for maintaining electrodes in engagement with said material for a third time interval after said second interval; and means responsive to the flow of welding current during said second interval for operating said contactor during said third interval.

16. In combination, a welding transformer having a single primary which has a pair of terminals; a first plurality of electric discharge paths each defined by an anode and a cathode; a second plurality of electric discharge paths each defined by an anode and a cathode; means having a first position in which the anodes of said first plurality are connected to one of said terminals and the cathodes of said second plurality are connected to the other of said terminals and a second position in which the cathodes of said first plurality are connected to said first terminal and the anodes of said second plurality to said second terminal, said means being selectively operable from one of said positions to the other; means for initially rendering one discharge device from each of said pluralities simultaneously conducting so that current initially flows through said primary and said last-named devices; and means for thereafter rendering one each of said discharge devices conducting in succession, discharge devices of each plurality being rendered conducting alternately.

17. Control apparatus for a polyphase-to-single-phase welder to be supplied from polyphase buses including a welding transformer having primary winding means, which control apparatus includes a plurality of main electric discharge devices; means connecting said devices in a conversion circuit having input and output terminals for converting power from a polyphase supply into single-phase pulses at a lower frequency than that of the supply derivable from said output terminals; means for connecting said input terminals to said buses; means for connecting said output terminals to said primary; said conversion circuit including means for rendering said devices individually conducting and non-conducting in a predetermined succession while said conversion circuit is connected as aforesaid, whereby at intervals commutation fluctuations are produced in said buses as said devices are rendered conducting and non-conducting; a sequence timer having a weld timing unit, said unit including a time-constant network for timing out the weld time, said sequence timer also including an auxiliary electric discharge device having a control circuit including said network, to be rendered conducting at the end of the weld time, and means connecting said device to said weld timing unit; means for connecting said sequence timer to said buses to derive energizing power from said buses; and means for connecting said weld unit to said conversion circuit to actuate said conversion circuit to operate as aforesaid during the weld time, said apparatus being characterized by the fact that said control circuit of said auxiliary discharge device is free of ripples from said buses.

18. In an electrical system of the character described, a pair of load circuits, a first control device operatively connected with a first of said circuits for controlling the energization thereof, a second control device operatively connected with the second of said circuits for controlling the energization thereof, a controlling network controlling at least two operational functions and including an initiating device for initiating an operational sequence thereof, one of said functions being to energize said circuits, a switching device operable in response to successive said operational sequences of said controlling network for alternately rendering said first and said second control device effective to permit conduction of current through its respective said circuit, and selectively operable control means for preventing energization of said circuits as a consequence of a said operational sequence of said controlling network and permitting said controlling network to control the other of said two functions, said control means also including means for rendering said controlling network ineffective to actuate said switching device so that, irrespective of the number of said operations of said controlling network which may be made when said selectively operable control means is effective, the next said operation of said controlling network subsequent to the rendering ineffective of said selectively operable control means will be effective to energize the opposite one of said circuits from the one of said circuits which was last energized.

19. In an electrical system of the character described, a ratchet relay having an energizable winding and a pair of circuit controlling components, a first circuit controlled by a first of said components, a second circuit controlled by a second of said components, said components being actuated by similar sequential changes in the energization of said winding whereby one of said components is moved to open the respective one of said circuits controlled thereby and the other of said components is moved to close the respective one of said circuits controlled thereby and vice versa, a second relay having an energizing winding and first contacts, a third circuit for controlling said ratchet relay including said first contacts of said second relay and said energizing winding of said ratchet relay, an initiating network including a first switch arranged in circuit with said first contacts of said second relay and a starting switch, said initiating network including means responsive to an actuation of said starting switch for actuating said first switch, a pair of load circuits, a fourth and a fifth relay each having an energizing winding and circuit controlling contacts, means connecting said load circuits to said initiating network for actuation thereof as a consequence of the actuation of said start switch and including said contacts of said fourth and said fifth relays, circuit means connecting said winding of said fourth relay for energization and deenergization by said first circuit controlling component of said ratchet relay, circuit means connecting said winding of said fifth relay for energization and deenergization by said second circuit controlling component of said ratchet relay, and a switch for controlling the energization of winding of said second relay.

20. A controlling network for a resistance welding machine having apparatus for relatively moving a pair of welding electrodes and for supplying a potential between said electrodes, a stepping relay having an energizable actuating winding and circuit controlling means actuated as a consequence of successive changes in energization of said winding, a weld current controlling circuit controlling the supply of potential to said electrodes, a pair of polarity determining circuits operatively connected to said weld current circuit for controlling the relative polarity of said electrodes, said polarity determining circuits being controlled by said circuit controlling means of said relay and arranged to be alternately actuated as a consequence of successive similar changes in energization of said stepping relay winding, a clamping circuit including an energizable device for controlling the movement of said electrodes, a sequencing timer for sequentially controlling the energization of said stepping relay winding and said clamping circuit and said weld current controlling circuit, and a selectively actuated switch means controlling the energization of said winding and of said weld current controlling circuit by said sequencing timer and effective in a first operative condition to render said sequencing timer effective to actuate said relay and weld current circuit and effective in a second operative condition to render said sequencing timer ineffective to actuate said relay and said weld current circuit.

References Cited in the file of this patent
UNITED STATES PATENTS

| | | |
|---|---|---|
| 1,064,541 | Reuter et al. | June 10, 1913 |
| 1,487,002 | Adams | Mar. 18, 1924 |
| 1,496,445 | Briggs | June 3, 1924 |
| 2,009,834 | Bedford | July 30, 1935 |
| 2,295,601 | Overbeck | Sept. 15, 1942 |
| 2,298,240 | Tolpfer | Oct. 6, 1942 |
| 2,309,280 | Stansbury | Jan. 26, 1943 |
| 2,314,691 | Dawson et al. | Mar. 23, 1943 |
| 2,334,430 | Moody | Nov. 16, 1943 |
| 2,356,859 | Leathers et al. | Aug. 29, 1944 |
| 2,390,981 | Bivens | Dec. 18, 1945 |
| 2,415,708 | Sciaky | Feb. 11, 1947 |
| 2,426,378 | Stanley | Aug. 26, 1947 |
| 2,474,867 | Sciaky | June 5, 1949 |
| 2,476,882 | Lexa | July 19, 1949 |
| 2,549,831 | Longini | Apr. 24, 1951 |
| 2,577,411 | Faulk | Dec. 4, 1951 |
| 2,593,964 | Birckhead | Apr. 22, 1952 |
| 2,600,585 | Solomon | June 17, 1952 |